United States Patent
LaPray et al.

(10) Patent No.: US 10,214,634 B2
(45) Date of Patent: Feb. 26, 2019

(54) ARTICLES FORMED WITH BIODEGRADABLE MATERIALS AND STRENGTH CHARACTERISTICS OF SAME

(71) Applicant: BiologiQ, Inc., Idaho Falls, ID (US)

(72) Inventors: Bradford LaPray, Idaho Falls, ID (US); Wenji Quan, Idaho Falls, ID (US)

(73) Assignee: BIOLOGIQ, INC., Idaho Falls, ID (US)

(*) Notice: Subject to any disclaimer, the term of this patent is extended or adjusted under 35 U.S.C. 154(b) by 0 days.

(21) Appl. No.: 15/628,379

(22) Filed: Jun. 20, 2017

(65) Prior Publication Data

US 2017/0283597 A1 Oct. 5, 2017

Related U.S. Application Data

(60) Continuation-in-part of application No. 15/481,806, filed on Apr. 7, 2017, and a continuation-in-part of application No. 15/481,823, filed on Apr. 7, 2017, and a division of application No. 14/853,725, filed on Sep. 14, 2015, and a continuation-in-part of application No. 14/853,780, filed on Sep. 14, 2015.

(60) Provisional application No. 62/442,432, filed on Jan. 4, 2017, provisional application No. 62/440,399, filed on Dec. 29, 2016, provisional application No. 62/187,231, filed on Jun. 30, 2015.

(51) Int. Cl.
C08L 3/02 (2006.01)

(52) U.S. Cl.
CPC ........................... C08L 3/02 (2013.01)

(58) Field of Classification Search
CPC ........................... C08L 23/06; C08L 3/02
See application file for complete search history.

(56) References Cited

U.S. PATENT DOCUMENTS

| | | | |
|---|---|---|---|
| 3,865,603 A | 2/1975 | Szymanski | |
| 5,026,745 A | 6/1991 | Weil | |
| 5,314,934 A | 5/1994 | Tomka | |
| 5,449,708 A | 9/1995 | Schiltz | |
| 5,462,983 A | 10/1995 | Bloembergen | |
| 5,714,445 A | 2/1998 | Trinh | |
| 6,211,325 B1 | 4/2001 | Sun | |
| 7,608,649 B2 * | 10/2009 | Sun | C08L 3/02 524/47 |

(Continued)

FOREIGN PATENT DOCUMENTS

| CN | 102850626 | 1/2013 |
|---|---|---|
| CN | 103289165 | 9/2013 |

(Continued)

OTHER PUBLICATIONS

International Search Report and Written Opinion for PCT PCT/US2017/068492 dated Mar. 16, 2018, 14 pages.

(Continued)

Primary Examiner — Arrie L Reuther
(74) Attorney, Agent, or Firm — Workman Nydegger

(57) ABSTRACT

Described herein are strength characteristics and biodegradation of articles produced using one or more petrochemical-based polymers and one or more carbohydrate-based polymers. A compatibilizer can optionally be included in the article. In some cases, the article can include a film or bag.

8 Claims, 15 Drawing Sheets

(56) References Cited

U.S. PATENT DOCUMENTS

| | | |
|---|---|---|
| 7,740,952 B2 | 6/2010 | Hausmann |
| 7,998,888 B2 | 8/2011 | Shi |
| 8,188,185 B2 | 5/2012 | Wang |
| 8,283,006 B2 | 10/2012 | Wang |
| 8,329,601 B2 | 12/2012 | Shi |
| 8,466,337 B2 | 6/2013 | Wang |
| 8,802,754 B2 | 8/2014 | Nie |
| 8,889,945 B2 | 11/2014 | Wang |
| 8,927,617 B2 | 1/2015 | Funk |
| 9,327,438 B2 | 5/2016 | Wang |
| 9,464,188 B2 | 10/2016 | Wang |
| 2002/0006989 A1 | 1/2002 | Bastioli |
| 2008/0103232 A1 | 5/2008 | Lake |
| 2009/0048368 A1 | 2/2009 | Bash |
| 2010/0159777 A1 | 6/2010 | Wang |
| 2010/0311874 A1 | 12/2010 | Mentink |
| 2011/0287929 A1 | 11/2011 | Smith |
| 2012/0059097 A1 | 3/2012 | Liao |
| 2012/0139154 A1 | 6/2012 | Huneault |
| 2012/0316257 A1 | 12/2012 | Bastioli |
| 2013/0157031 A1 | 6/2013 | Wang |
| 2013/0157152 A1 | 6/2013 | Wang |
| 2014/0011921 A1 | 1/2014 | Bash |
| 2014/0079935 A1 | 3/2014 | Broyles |
| 2014/0272370 A1 | 9/2014 | Broyles |
| 2016/0107426 A1 | 4/2016 | Leufgens |
| 2018/0100060 A1 | 4/2018 | Lapray |

FOREIGN PATENT DOCUMENTS

| | | | |
|---|---|---|---|
| JP | 3539955 | 7/2004 | |
| WO | 2003014164 | 11/2004 | |
| WO | 2009073197 | 6/2009 | |
| WO | 2009103052 | 8/2009 | |
| WO | 2013116945 | 8/2013 | |
| WO | 2014190395 | 12/2014 | |
| WO | WO-2014190395 A1 * | 12/2014 | ............ C08L 23/06 |

OTHER PUBLICATIONS

"Compostable Plastics 101: An Overview of Compostable Plastics Sponsored by the California Organics Recycling Council" based on information and belief, available at least as early as 2012, 23 pages.

Yoshida, et al., "A Bacterium that Degrades and Assimilates Poly(ehylene terphthalate)" Sciense Magazine vol. 351 Issue 6278 Mar. 11, 2016 pp. 1196-1199.

"Discover Polysaccharides" Available at http://polysac3db.cermav.cnrs.fr/discover_starch.html; Accessed Feb. 16, 2017, 10 pages.

Office Action for U.S. Appl. No. 14/853,780 dated Nov. 6, 2017.

Final Office Action for U.S. Appl. No. 14/853,725 dated Nov. 8, 2017.

Ibbrucker, Constance "Can Additives make plastics biodegradable?" Bioplastics Magazine Jan. 2017, 1 page.

Ibbrucker, Constance "Oxo-degradable plastics increasingly under fire in Europe" European Bioplastics, http://www.european-bioplastics.org/oxo-degradable-plastics-increasingly-under-fire-in-europe/ Feb. 28, 2017, 5 pages.

"'Oxo-Biodegradable' Plastics and Other Plastics with Additives for Degradation" European Bioplastics BackGround Oct. 2015, 5 pages.

"BPI Position on Degradable Additives" Feb. 2010, 6 pages.

"The SPC Position Against Biodegradability Additives for Petroleum-Based Plastics" Sustainable Packaging Coalition, http://www.sustainablepackaging.org/content/?type=5&id=position-against-biodegradability-additives-for-petroleum-based-plastics Retreived on Sep. 19, 2017, 5 pages.

"APR Position Statement—Degradable Additives Use in Bottles, Forms and Films" The Association of Postconsumer Plastic Recyclers, http://plasticsrecycling.org/about/position-statements, Apr. 27, 2015, 1 page.

U.S. Appl. No. 15/691,588, filed Aug. 30, 2017, LaPray.

Ojeda, Telmo, et al., "Polymer Degradation and Stability" Available as early as Dec. 16, 2010 at www.elsevier.com/locat/polydegstab, 5 pages.

Thakore, I.M., et al., "Studies on Biodegradability, morphology and thermo-mechanical properties of LDPE/modified starch blends" published in The European Polymer Journal, vol. 37 2001, pp. 151-160.

Vargha, et al., "Behavior of Polyethylene Films in Soil" published in Periodica Polytechnica Chemical Engineering, Nov. 5, 2015 pp. 60-68.

Li, Gang, et al., "Biodegradation of Thermoplastic Starch and its Blends with Poly(lactic acid) and Polyethylene: Influence of Morphology" published in Macromolecular Journals of Chemistry and Physics, 2011 pp. 1147-1154.

Tokiwa, et al., "Biodegradability of Plastics" in the International Journal of Molecular Sciences, Aug. 26, 2009, vol. 10, pp. 3722-3742.

U.S. Appl. No. 15/481,806, filed Apr. 7, 2017, LaPray.

U.S. Appl. No. 15/481,823, filed Apr. 7, 2017, LaPray.

PCT Search Report dated Sep. 14, 2016 for PCT/US2016/040092, 1 page.

PCT Search Report dated Sep. 15, 2016 for PCT/US2016/040104, 1 page.

Kalambur, et al., "An Overview of Starch-Based Plastic Blends from Reactive Extrusion" Journal of Plastic Film and Sheeting, 2006, vol. 22, pp. 39-58.

Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.

Tang, et al., "Recent Advances in Starch, Polyvinyl Alcohol Based Polymer Blends, Nanocomposites and their Biodegradability" Carbohydrate Polymers, 2011, vol. 85, pp. 7-16.

Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.

Braskem "Life Cycle Assessment of Green Plastic" Available as early as Mar. 28, 2017, accessed at http://www.braskem.com_site.aspx_plastic-green, 18 pages.

De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.

U.S. Appl. No. 14/853,780, Oct. 12, 2016, Office Action.

U.S. Appl. No. 14/853,725, Apr. 28, 2017, Office Action.

Arevalo-Nino et al., "Starch-based extruded plastic films and evaluation of their biodegradable properties" Biodegradation 7: 231-237, 1996.

Chen et al. "Environmental Degradation of Starch/Poly (Lactic Acid) Composite in Seawater" Apr. 6, 2010.

"Environmentally Degradable Plastics" Leonardo Da Vinci Program; Jan. 2000-Dec. 2006.

Esmaeili, Atefeh, et al. "Biodegradation of Low-Density Polyethylene (LDPE) by Mixed Culture of Lysinibacillus xylanilyticus and Aspergillus niger in Soil." PLoS One 8(9): e71720, Sep. 23, 2013. https://doi.org/10.1371/journal.pone.0071720. Accessed Apr. 16, 2018.

Gupta, Apeksha et al. "Visible Range Photocatalysts for Solid Phase Photocatalytic Degradation of Polyethylene and Polyvinyl Chloride." Journal of the Chilean Chemical Society, [S.I.], v. 62, n. 1, Jun. 2017. ISSN 0717-9707. <https://jcchems.com/index.php/JCCHEMS/article/view/156>. Accessed: Apr. 20, 2018.

Luo, Ying, et al. "Accelerating the degradation of polyethylene composite mulches." Plastics Research Online, May 19, 2017. Society of Plastics Engineers (SPE), DOI: 10.2417/spepro.006909. Accessed Apr. 20, 2018.

Oluz, Zehra and Teoman Tinçer. "Additives for ultraviolet-induced oxidative degradation of low-density polyethylene." J. Appl. Polym. Sci., 133, 43354, Jan. 18, 2016. Wiley Online Library, DOI: 10.1002/app.43354. Accessed Apr. 21, 2018.

Shang, Jing, et al. "Photocatalytic Degradation of Polystyrene Plastic under Fluorescent Light." Environmental Science & Tech-

(56) References Cited

OTHER PUBLICATIONS

*nology*, Sep. 5, 2003, 37 (19), pp. 4494-4499. American Chemical Society, DOI: 10.1021/es0209464. Accessed Apr. 20, 2018.
Shogren et al. "Biodegradation of starch/polylactic acid/poly(hydroxyester-ether) composite bars in soil" Polymer Degradation and Stability 79 (2003) 405-411.
Sumathi, Tirupati et al. "Production of Laccase by *Cochliobolus* sp. Isolated from Plastic Dumped Soils and Their Ability to Degrade Low Molecular Weight PVC." *Biochemistry Research International* 2016 (2016): 9519527. PMC. Web. Apr. 16, 2018.
Thryft, Ann R. "Biodegradable Plastics Standard to Bust Landfill Waste." ENSO Plastics, Nov. 15, 2011. http://ensoplastics.com/theblog/?p=535. Accessed Apr. 23, 2018.
"Transition Metal Salts." Oxo-biodegradable Plastics Association, http://www.biodeg.org/index.html. Accessed Apr. 20, 2018.
Zhang, et al. "Retrogradation and Antiplasticization of Thermoplastic Starch" Mar. 2012.
U.S. Appl. No. 15/691,588, Apr. 30, 2018, Office Action.
U.S. Appl. No. 15/481,823, Apr. 30, 2018, Office Action.
U.S. Appl. No. 15/481,806, Apr. 30, 2018, Office Action.

\* cited by examiner

ASTM D6400 Phytoxicity    Sample 100
Inoculum: None            Cucumis Sativus (cucumber)
Interval: 12 days         Result 64.6 mm ASTM D6400 Phytoxicity    Sample 100
Inoculum: None            Glycine max (soybean)
Interval: 12 days         Result 139 mm ASTM D6400 Phytoxicity  Sample 200
Inoculum: None  Cucumis Sativus (cucumber)
Interval: 12 days  Result 69.2 mm ASTM D6400 Phytoxicity  Sample 200
Inoculum: None  Glycine max (soybean)
Interval: 12 days  Result 172.5 mm ASTM D6400 Phytoxicity  Sample 300
Inoculum: None  Cucumis Sativus (cucumber)
Interval:12 days  Result 70.3 mm ASTM D6400 Phytoxicity  Sample 300
Inoculum: None  Glycine max (soybean)
Interval:12 days  Result 153.4 mm

ASTM D6400 Elemental Analysis
Sample 100

Result (As) Arsenic - not detected <MDL 0.237 ppm - PASS       0.237 mg/kg dwt (Cd) Cadmium - not detected <MDL 0.237 ppm - PASS       0.237 mg/kg dwt (Cu) Copper - not detected < MDL 0.454 - PASS           0.454 mg/kg dwt (Pb) Lead - not detected <MDL 0.293 ppm - PASS          0.293 mg/kg dwt (Hg) Mercury - not detected <MDL 0.256 ppm - PASS       0.256 mg/kg dwt (Ni) Nickel - not detected <MDL 0.246 ppm - PASS        0.246 mg/kg dwt (Se) Selenium - not detected <MDL 0.549 ppm - PASS      0.549 mg/kg dwt (Zn) Zinc - PASS                                        27.1 mg/kg dwt

FIG. 14A

ASTM D6400 Elemental Analysis
Sample 200

Result (As) Arsenic - not detected <MDL 0.237 ppm - PASS       0.237 mg/kg dwt (Cd) Cadmium - not detected <MDL 0.237 ppm - PASS       0.237 mg/kg dwt (Cu) Copper - not detected < MDL 0.454 - PASS           0.454 mg/kg dwt (Pb) Lead - not detected <MDL 0.293 ppm - PASS          0.293 mg/kg dwt (Hg) Mercury - not detected <MDL 0.256 ppm - PASS       0.256 mg/kg dwt (Ni) Nickel - not detected <MDL 0.246 ppm - PASS        0.246 mg/kg dwt (Se) Selenium - not detected <MDL 0.549 ppm - PASS      0.549 mg/kg dwt (Zn) Zinc - PASS                                        27.1 mg/kg dwt

FIG. 14B

ASTM D6400 Elemental Analysis
Sample 300

Notes Sectio

| | Result |
|---|---|
| (As) Arsenic - not detected <MDL 0.237 ppm - PASS | 0.237 mg/kg dwt |
| (Cd) Cadmium - not detected <MDL 0.237 ppm - PASS | 0.237 mg/kg dwt |
| (Cu) Copper - not detected < MDL 0.454 - PASS | 0.454 mg/kg dwt |
| (Pb) Lead - not detected <MDL 0.293 ppm - PASS | 0.293 mg/kg dwt |
| (Hg) Mercury - not detected <MDL 0.256 ppm - PASS | 0.256 mg/kg dwt |
| (Ni) Nickel - not detected <MDL 0.246 ppm - PASS | 0.246 mg/kg dwt |
| (Se) Selenium - not detected <MDL 0.549 ppm - PASS | 0.549 mg/kg dwt |
| (Zn) Zinc - not detected <MDL 2.72 ppm - PASS | 2.72 mg/kg dwt |

FIG. 15A

ASTM D6400 Elemental Analysis
Sample 400

Notes Sectio

| | Result |
|---|---|
| (As) Arsenic - not detected <MDL 0.237 ppm - PASS | 0.237 mg/kg dwt |
| (Cd) Cadmium - not detected <MDL 0.237 ppm - PASS | 0.237 mg/kg dwt |
| (Cu) Copper - PASS | 1.52 mg/kg dwt |
| (Pb) Lead - not detected <MDL 0.293 ppm - PASS | 0.293 mg/kg dwt |
| (Hg) Mercury - not detected <MDL 0.256 ppm - PASS | 0.256 mg/kg dwt |
| (Ni) Nickel - PASS | 0.256 mg/kg dwt |
| (Se) Selenium - not detected <MDL 0.549 ppm - PASS | 0.549 mg/kg dwt |
| (Zn) Zinc - PASS | 18.6 mg/kg dwt |

FIG. 15B

ARTICLES FORMED WITH BIODEGRADABLE MATERIALS AND STRENGTH CHARACTERISTICS OF SAME

PRIORITY CLAIM AND CROSS-REFERENCE TO RELATED APPLICATIONS

This application is a Divisional of U.S. patent application Ser. No. 14/853,725 filed on Sep. 14, 2015, entitled "Articles Formed with Biodegradable Materials and Strength Characteristics of Same," which application claims the benefit of, and priority to, U.S. Provisional Patent Application No. 62/187,231 filed on Jun. 30, 2015. This application is also a continuation of U.S. patent application Ser. Nos. 15/481,806 and 15/481,823, both filed Apr. 7, 2017. Each of the above referenced applications is incorporated by reference in its entirety herein.

This application also incorporates by reference and claims the benefit of each of U.S. application Ser. No. 14/853,780 filed Sep. 14, 2015, U.S. Application No. 62/440,399 filed Dec. 29, 2016, and U.S. Application No. 62/442,432 filed Jan. 4, 2017. Each of the above referenced applications is incorporated by reference in its entirety herein.

BACKGROUND

Traditional petrochemical-based plastics are formulated to be strong, lightweight, and durable. However, these plastics are typically not biodegradable, and as a result, hundreds of millions of tons of plastic sits in landfills or floats in the ocean. In trying to reduce the amount of plastic waste, some articles typically produced using petrochemical-based plastics are being produced using biodegradable materials.

SUMMARY

This disclosure is directed to articles that are formed with biodegradable materials. In particular, the disclosure describes strength characteristics and biodegradability of the articles formed with the biodegradable materials. Processes to produce the articles with biodegradable materials are also described. In some cases, articles can be produced from a mixture of one or more petrochemical-based polymeric materials and one or more carbohydrate-based polymeric materials. In a particular example, the one or more carbohydrate-based polymeric materials can include one or more starch-based polymeric materials. Optionally, a compatibilizer can also be used to form the articles.

In an implementation, a process to produce an article can include providing one or more petrochemical-based polymeric materials and one or more carbohydrate-based polymeric materials. The one or more petrochemical-based polymeric materials and the one or more carbohydrate-based polymeric materials can then be mixed and heated. The resulting mixture can be extruded into a number of plastic products using plastics processing equipment, such as injection molders, blow molders, thermoformers, etc., and a gas can be injected into the extruded mixture to form a film. Optionally, the extruded film can then be processed into a bag or another type of article.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures generally indicates similar or identical items.

FIG. 14A and FIG. 14B show the results of the elemental analysis portion of the ASTM D6400 test based on Table 3 of 40 Code of Federal Regulations (C.F.R.) Part 503.13 for a first sample and a second sample formed according to techniques described herein.

FIG. 15A and FIG. 15B show the results of the elemental analysis portion of the ASTM D6400 test based on Table 3 of 40 C.F.R. Part 503.13 for a third sample and a fourth sample formed according to techniques described herein.

DETAILED DESCRIPTION

The present disclosure is directed to, among other things, articles that are formed from biodegradable materials, as well as systems and processes to produce such articles. Generally, the articles of the present disclosure include one or more carbohydrate-based polymeric materials. The articles can also be produced using a mixture of one or more carbohydrate-based polymeric materials and one or more petrochemical-based polymeric materials. In an implementation, articles can be formed by mixing one or more carbohydrate-based polymeric materials and one or more petrochemical-based polymeric materials, heating the mixture, and extruding the mixture. In various embodiments, the carbohydrate-based polymeric materials can include starch-based polymeric materials.

The articles described herein can be produced in the form of films, bags, and the like which are made using blown film equipment along with other articles that are produced using injection molding, blow molding, thermoforming, and other plastic manufacturing processes. "Film," as used herein, refers to a thin continuous article that includes one or more polymeric materials that can be used to separate areas or volumes, to hold items, to act as a barrier, and/or as a printable surface. "Bag," as used herein, refers to a container made of a relatively thin, flexible film that can be used for containing and/or transporting goods.

The techniques and processes described herein can be implemented in a number of ways. Example implementations are provided below with reference to the following figures.

Figure 1:
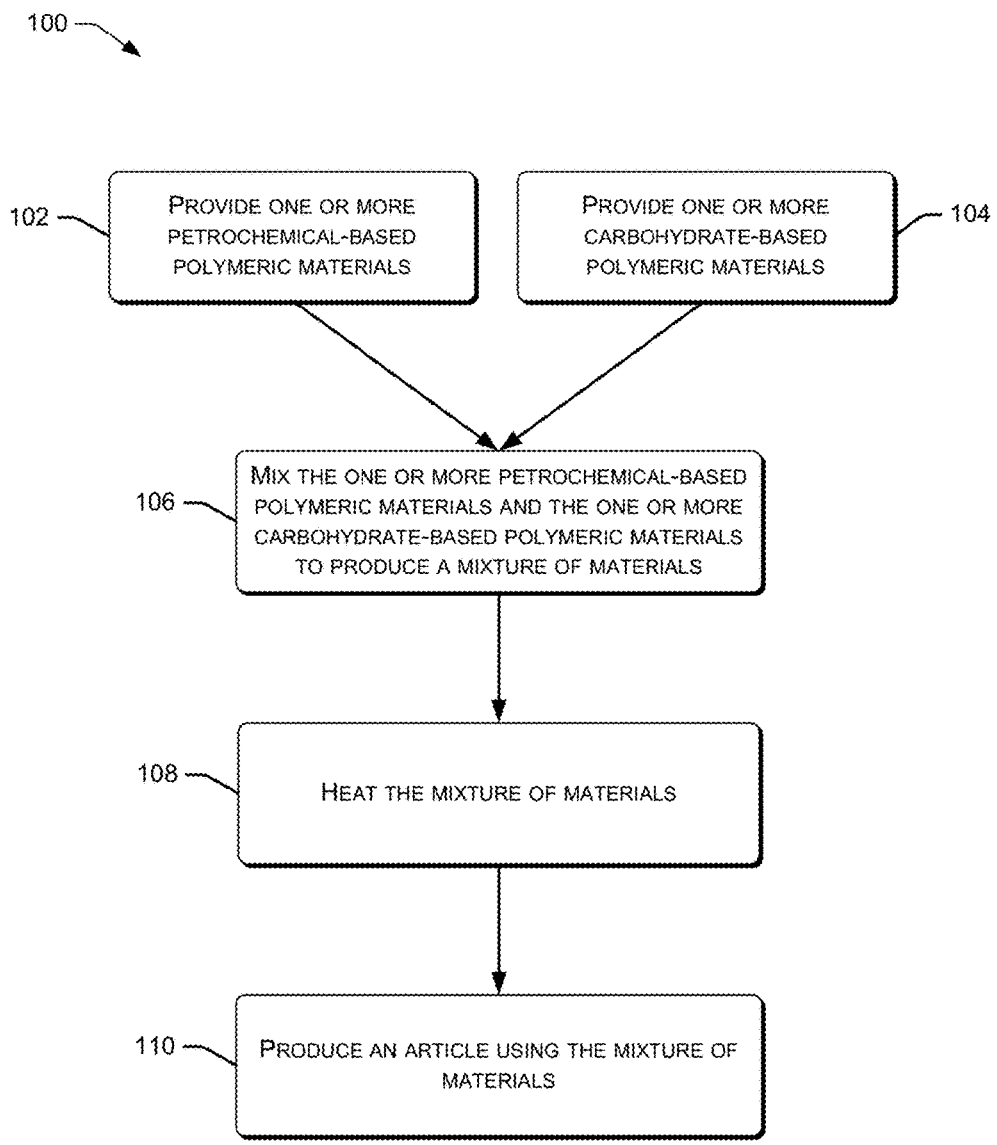
FIG. 1 illustrates a flow diagram of an example process of forming an article including biodegradable materials.

FIG. 1 illustrates an example process 100 of manufacturing an article including biodegradable materials. At 102, the process 100 can include providing one or more petrochemical-based polymeric materials. In addition, at 104, the process 100 can include providing one or more carbohydrate-based polymeric materials. In some cases, the one or more carbohydrate-based polymeric materials can include one or more starch-based polymeric materials. The one or more carbohydrate-based polymeric materials and the one or more petrochemical-based polymeric materials can be provided in a particular form, such as pellets, powders, nurdles, slurry, and/or liquids. In specific embodiments, pellets can be used.

In addition, providing the one or more petrochemical-based polymeric materials and the one or more carbohydrate-based polymeric materials can include feeding the one or more petrochemical-based polymeric materials and the one or more carbohydrate-based polymeric materials into an extruder. For example, the one or more carbohydrate-based polymeric materials and the one or more petrochemical-based polymeric materials can be fed into one or more hoppers of an extruder. In some cases, the one or more carbohydrate-based polymeric materials and the one or more petrochemical-based polymeric materials can be fed into the extruder at approximately the same time. In other situations, the one or more carbohydrate-based polymeric materials and the one or more petrochemical-based polymeric materials can be fed into the extruder at different times. Furthermore, the one or more carbohydrate-based polymeric materials and the one or more petrochemical-based polymeric materials can be fed into a chamber of the extruder. In an implementation, the one or more carbohydrate-based polymeric materials and the one or more petrochemical-based polymeric materials can be fed into the same chamber of the extruder. In another implementation, the one or more carbohydrate-based polymeric materials and the one or more petrochemical-based polymeric materials can be fed into different chambers of the extruder.

In some cases, the petrochemical-based polymeric materials can include polyolefins. For example, the petrochemical-based polymeric materials can include a polyethylene (PE), a polypropylene (PP), a polystyrene (PS), a high impact polystyrene (HIPS), a nylon, a polymethylpentene, a polybutene, or combinations thereof. In various embodiments, the petrochemical based polymeric materials can include an ultra-high-molecular-weight polyethylene (UL-MWPE), an ultra-low-molecular-weight polyethylene (ULMWPE), a high-molecular-weight polyethylene (HMWPE), a high-density polyethylene (HDPE), a high-density cross-linked polyethylene (HDXLPE), a cross-linked polyethylene (PEX or XLPE), a medium-density polyethylene (MDPE), a linear low-density polyethylene (LLDPE), a low-density polyethylene (LDPE), or a very-low-density polyethylene (VLDPE). In specific embodiments, the petrochemical-based polymeric materials can include a LLDPE. In some cases, a LLDPE can be formed using a metallocene catalyst.

The one or more carbohydrate-based polymeric materials can include one or more starches. For example, the one or more starches can be produced from one or more plants, such as corn starch, tapioca starch, cassava starch, wheat starch, potato starch, rice starch, sorghum starch, and the like. In various embodiments, the starch-based polymers can include a mixture of starches derived from two or more plants, three or more plants, or four or more plants. In some cases, the one or more carbohydrate-based polymeric materials can also include a plasticizer. Additionally, an amount of water can be present in the one or more carbohydrate-based polymeric materials.

In an implementation, the one or more carbohydrate-based polymeric materials can include at least about 65% by weight of one or more starches, at least about 70% by weight of one or more starches, at least about 75% by weight of one or more starches, or at least about 80% by weight of one or more starches. In addition, the one or more carbohydrate-based polymeric materials can include no greater than about 99% by weight of one or more starches, no greater than about 95% by weight of one or more starches, no greater than about 90% by weight of one or more starches, or no greater than about 85% by weight of one or more starches. In an illustrative example, the one or more carbohydrate-based polymeric materials can include from about 60% by weight to about 99% by weight of one or more starches. In another illustrative example, the one or more carbohydrate-based polymeric materials can include from about 65% by weight to about 80% by weight of one or more starches.

In some embodiments, a starch can be present in a mixture of starches at an amount of at least about 5% by weight, at least about 10% by weight, at least about 15% by weight, at least about 20% by weight, at least about 25% by weight, at least about 30% by weight, at least about 35% by weight, or at least about 40% by weight. In addition, a starch can be present in a mixture of starches at an amount no greater than about 95% by weight, no greater than about 90% by weight, no greater than about 85% by weight, no greater than about 80% by weight, no greater than about 75% by weight, no greater than about 70% by weight, no greater than about 65% by weight, no greater than about 60% by weight, no greater than about 55% by weight, or no greater than about 50% by weight. In some embodiments, a starch can be present in a mixture of starches in an amount from about 20% by weight to about 25% by weight, from about 30% by weight to about 35% by weight, from about 45% by weight to about 55% by weight, or from about 70% by weight to about 80% by weight.

In an implementation, the one or more carbohydrate-based polymeric materials can include a mixture of a first starch and a second starch. In these cases, the carbohydrate-based polymeric material can include at least about 50% by weight of the first starch, at least about 55% by weight of the first starch, at least about 60% by weight of the first starch, at least about 65% by weight of the first starch, or at least about 70% by weight of the first starch. Additionally, the carbohydrate-based polymeric material can include no greater than about 95% by weight of the first starch, no greater than about 90% by weight of the first starch, no greater than about 85% by weight of the first starch, no greater than about 80% by weight of the first starch, or no greater than about 75% by weight of the first starch. In an illustrative example, the Carbohydrate-based polymeric material can include from about 50% by weight to about 98% by weight of the first starch. In another illustrative example, the carbohydrate-based polymeric material can include from about 55% by weight to about 85% by weight of the first starch. In an additional illustrative example, the carbohydrate-based polymeric material can include from about 55% by weight to about 70% by weight of the first starch. In a further illustrative example, the carbohydrate-based polymeric material can include from about 75% by weight to about 90% by weight of the first starch. Also, the carbohydrate-based polymeric material can include from about 65% by weight to about 75% by weight of the first starch.

With regard to the second starch included in a carbohydrate-based material having a mixture of a first starch and a second starch, the carbohydrate-based polymeric material can include at least about 5% by weight of the second starch, at least about 10% by weight of the second starch, at least about 15% by weight of the second starch, at least about 20% by weight of the second starch, or at least about 25% by weight of the second starch. Additionally, the carbohydrate-based polymeric material can include no greater than about 50% by weight of the second starch, no greater than about 45% by weight of the second starch, no greater than about 40% by weight of the second starch, no greater than about 35% by weight of the second starch, or no greater than about 30% by weight of the second starch. In an illustrative example, the carbohydrate-based polymeric material can include from about 2% by weight to about 50% by weight of the second starch. In another illustrative example, the carbohydrate-based polymeric material can include from about 10% by weight to about 45% by weight of the second starch. In an additional illustrative example, the carbohydrate-based polymeric material can include from about 15% by weight to about 25% by weight of the second starch. In a further illustrative example, the carbohydrate-based polymeric material can include from about 35% by weight to about 45% by weight of the second starch. Also, the carbohydrate-based polymeric material can include from about 25% by weight to about 35% by weight of the second starch.

In some implementations, the one or more carbohydrate-based polymeric materials can include a mixture of a first starch, a second starch, and a third starch. For example, the carbohydrate-based polymeric material can include at least about 30% by weight of the first starch, at least about 35% by weight of the first starch, at least about 45% by weight of the first starch, at least about 50% by weight of the first starch, or at least about 55% by weight of the first starch. In addition, the carbohydrate-based polymeric material can include no greater than about 80% by weight of the first starch, no greater than about 75% by weight of the first starch, no greater than about 70% by weight of the first starch, no greater than about 65% by weight of the first starch, or no greater than about 60% by weight of the first starch. In an illustrative example, the carbohydrate-based material can include from about 30% by weight to about 80% by weight of the first starch. In another illustrative example, the carbohydrate-based material can include from about 30% by weight to about 40% by weight of the first starch. In an additional illustrative example, the carbohydrate-based material can include from about 45% by weight to about 55% by weight of the first starch. In a further illustrative example, the carbohydrate-based material can include from about 55% by weight to about 65% by weight of the first starch.

Additionally, in a carbohydrate-based polymeric material that includes a mixture of a first starch, a second starch, and a third starch, the carbohydrate-based polymeric material can include at least about 5% by weight of the second starch, at least about 10% by weight of the second starch, at least about 15% by weight of the second starch, or at least about 20% by weight of the second starch. In an implementation, the carbohydrate-based polymeric material can include no greater than about 40% by weight of the second starch, no greater than about 35% by weight of the second starch, no greater than about 30% by weight of the second starch, or no greater than about 25% by weight of the second starch. In an illustrative example, the carbohydrate-based polymeric material can include from about 5% by weight to about 40% by weight of the second starch. In another illustrative example, the carbohydrate-based polymeric material can include from about 15% by weight to about 25% by weight of the second starch. In an additional illustrative example, the carbohydrate-based polymeric material can include from about 27% by weight to about 38% by weight of the second starch.

Further, when the carbohydrate-based polymeric material includes a mixture of a first starch, a second starch, and a third starch, the carbohydrate-based polymeric material can include at least about 5% by weight of the third starch, at least about 10% by weight of the third starch, at least about 15% by weight of the third starch, or at least about 20% by weight of the third starch. In an implementation, the carbohydrate-based polymeric material can include no greater than about 40% by weight of the third starch, no greater than about 35% by weight of the third starch, no greater than about 30% by weight of the third starch, or no greater than about 25% by weight of the third starch. In an illustrative example, the carbohydrate-based polymeric material can include from about 5% by weight to about 40% by weight of the third starch. In another illustrative example, the carbohydrate-based polymeric material can include from about 15% by weight to about 25% by weight of the third starch. In an additional illustrative example, the carbohydrate-based polymeric material can include from about 27% by weight to about 38% by weight of the third starch.

A plasticizer included in the one or more carbohydrate-based polymeric materials can include polyethylene glycol, sorbitol, glycerin, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, other acid esters, or combinations thereof. In specific implementations, the one or more carbohydrate-based polymeric materials can include glycerin.

In an implementation, the one or more carbohydrate-based polymeric materials can include at least about 12% by weight of a plasticizer, at least about 15% by weight of a plasticizer, at least about 18% by weight of a plasticizer, at least about 20% by weight of a plasticizer, or at least about 22% by weight of a plasticizer. Additionally, the one or more carbohydrate-based polymeric materials can include no greater than about 35% by weight of a plasticizer, no greater than about 32% by weight of a plasticizer, no greater than about 30% by weight of a plasticizer, no greater than about 28% by weight of a plasticizer, or no greater than about 25% by weight of a plasticizer. In an illustrative example, the one or more carbohydrate-based polymeric materials can include from about 12% by weight to about 35% by weight of a plasticizer. In another illustrative example, the one or more carbohydrate-based polymeric materials can include from about 15% by weight to about 30% by weight of a plasticizer. In an additional illustrative example, the one or more carbohydrate-based polymeric materials can include from about 18% by weight to about 28% by weight of a plasticizer.

In some cases, the one or more carbohydrate-based polymeric materials include no greater than about 5% by weight water, no greater than about 4% by weight water, no greater than about 3% by weight water, no greater than about 2% by weight water, or no greater than about 1% by weight water. Additionally, the one or more carbohydrate-based polymeric materials can include at least about 0.1% by weight water, at least about 0.3% by weight water, at least about 0.6% by weight water, or at least about 0.8% by weight water. In an illustrative example, the one or more carbohydrate-based polymeric materials include from about 0.1% by weight to about 5% by weight water. In another illustrative example, the one or more carbohydrate-based polymeric materials include from about 0.4% by weight to about 2% by weight water. In an additional illustrative example, the one or more carbohydrate-based polymeric materials can include from about 0.5% by weight to about 1.5% by weight water.

At 106, the process 100 includes mixing the one or more petrochemical-based polymeric materials and the one or more carbohydrate-based polymeric materials to produce a mixture of materials. In some cases, the mixing of the one or more petrochemical-based polymeric materials and the one or more carbohydrate-based materials can be performed using one or more mixing devices. In a particular implementation, a mechanical mixing device can be used to mix the one or more petrochemical-based polymeric materials and the one or more carbohydrate-based polymeric materials. In an implementation, at least a portion of the components of the mixture of the materials can be combined in an apparatus, such as an extruder. In other implementations, at least a portion of the components of the mixture of the materials can be combined before being fed into the extruder.

In various implementations, the one or more carbohydrate-based polymeric materials can be present in the mixture of materials an amount of at least about 5% by weight of the mixture of materials, at least about 10% by weight of the mixture of materials, at least about 15% by weight of the mixture of materials, at least about 20% by weight of the mixture of materials, at least about 25% by weight of the mixture of materials, at least about 30% by weight of the materials, at least about 35% by weight of the mixture of materials, at least about 40% by weight of the mixture of materials, or at least about 45% by weight of the mixture of materials. In other implementations, the one or more carbohydrate-based polymeric materials can be present in the mixture of materials in an amount of no greater than about 99% by weight of the mixture of materials, no greater than about 95% by weight of the mixture of materials, no greater than about 90% by weight of the mixture of materials, no greater than about 80% by weight of the mixture of materials, no greater than about 70% by weight of the mixture of materials, no greater than about 60% by weight of the mixture of materials, or no greater than about 50% by weight of the mixture of materials. Additionally, the one or more carbohydrate-based polymeric materials can be present in the mixture of materials in an amount from about 20% by weight to about 40% by weight of the mixture of materials. In an illustrative example, the mixture of materials can include from about 2% by weight to about 98% by weight of the one or more carbohydrate-based polymeric materials. In another illustrative example, the mixture of materials can include from about 10% by weight to about 40% by weight of the one or more carbohydrate-based polymeric materials. In an additional illustrative example, the mixture of materials can include from about 20% by weight to about 30% by weight of the one or more carbohydrate-based polymeric materials. In a further illustrative example, the mixture of materials can include from about 50% by weight to about 80% by weight of the one or more carbohydrate-based polymeric materials. In still another illustrative example the mixture of materials can include from about 40% by weight to about 60% by weight of the one or more carbohydrate-based polymeric materials.

In some implementations, the mixture of materials can include at least about 10% by weight of the one or more petrochemical-based polymeric materials, at least about 15% by weight of the one or more petrochemical-based polymeric materials, at least about 20% by weight of the one or more petrochemical-based polymeric materials, at least about 25% by weight of the one or more petrochemical-based polymeric materials, at least about 30% by weight of the one or more petrochemical-based polymeric materials, at least about 35% by weight of the one or more petrochemical-based polymeric materials, at least about 40% by weight of the one or more petrochemical-based polymeric materials, at least about 45% by weight of the one or more petrochemical-based polymeric materials, or at least about 50% by weight of the one or more petrochemical-based polymeric materials. In addition, the mixture of materials can include no greater than about 99% by weight of the one or more petrochemical-based polymeric materials, no greater than about 95% by weight of the one or more petrochemical-based polymeric materials, no greater than about 90% by weight of the one or more petrochemical-based polymeric materials, no greater than about 85% by weight of the one or more petrochemical-based polymeric materials, no greater than about 80% by weight of the one or more petrochemical-based polymeric materials, no greater than about 75% by weight of the one or more petrochemical-based polymeric materials, no greater than about 70% by weight of the one or more petrochemical-based polymeric materials, no greater than about 65% by weight of the one or more petrochemical-based polymeric materials, or no greater than about 60% by weight of the one or more petrochemical-based polymeric materials. In an illustrative example, the mixture of materials can include from about 2% by weight to about 98% by weight of the one or more petrochemical-based polymeric materials. In another illustrative example, the mixture of materials can include from about 50% by weight to about 90% by weight of the one or more petrochemical-based polymeric materials. In an additional illustrative example, the mixture of materials can include from about 65% by weight to about 75% by weight of the one or more petrochemical-based polymeric materials. In a further illustrative example, the mixture of materials can include from about 20% by weight to about 50% by weight of the one or more petrochemical-based polymeric materials. In still another illustrative example, the mixture of materials can include from about 40% by weight to about 60% by weight of the one or more petrochemical-based polymeric materials.

In some cases, the mixture of materials can include a blend of a first petrochemical-based polymeric material and a second petrochemical based polymeric material, where the second petrochemical-based polymeric material can be compostable. That is, in some cases, the second petrochemical-based polymeric material can be compostable according to the ASTM D6400 standard at the time of filing of this patent application.

In an implementation, when the mixture of materials includes a first petrochemical-based polymeric material and a second petrochemical-based polymeric material, the mixture of materials can include at least about 10% by weight of the first petrochemical-based polymeric material, at least about 15% by weight of the first petrochemical-based polymeric material, at least about 20% by weight of the first petrochemical-based polymeric material, or at least about 25% by weight of the first petrochemical-based polymeric material. Additionally, when the mixture of materials includes a first petrochemical-based polymeric material and a second petrochemical-based polymeric material, the mixture of materials can include no greater than about 50% by weight of the first petrochemical-based polymeric material, no greater than about 45% by weight of the first petrochemical-based polymeric material, no greater than about 40% by weight of the first petrochemical-based polymeric material, no greater than about 35% by weight of the first petrochemical-based polymeric material, or no greater than about 30% by weight of the first petrochemical-based polymeric material. In an illustrative example when the mixture of materials includes a first petrochemical-based polymeric material and a second petrochemical-based polymeric material, the mixture of materials can include from about 5% by weight to about 55% by weight of the first petrochemical-based polymeric material. In another illustrative example when the mixture of materials includes a first petrochemical-based polymeric material and a second petrochemical-based polymeric material, the mixture of materials can include from about 10% by weight to about 30% by weight of the first petrochemical-based polymeric material. In an additional illustrative example when the mixture of materials includes a first petrochemical-based polymeric material and a second petrochemical-based polymeric material, the mixture of materials can include from about 12% by weight to about 20% by weight of the first petrochemical-based polymeric material. In some instances, the first petrochemical-based polymeric material can include a polyethylene. To illustrate, the first petrochemical-based polymeric material can include a linear low density polyethylene. In some cases, the first petrochemical-based polymeric material may not be compostable according to the ASTM D6400 standard.

Furthermore, when the mixture of materials includes a first petrochemical-based polymeric material and a second petrochemical-based polymeric material, the mixture of materials can include at least about 25% by weight of the second petrochemical-based polymeric material, at least about 30% by weight of the second petrochemical-based polymeric material, at least about 35% by weight of the second petrochemical-based polymeric material, at least about 40% by weight of the second petrochemical-based polymeric material, or at least about 45% by weight of the second petrochemical-based polymeric material. Also, when the mixture of materials includes a first petrochemical-based polymeric material and a second petrochemical-based polymeric material, the mixture of materials can include no greater than about 75% by weight of the second petrochemical-based polymeric material, no greater than about 70% by weight of the second petrochemical-based polymeric material, no greater than about 65% by weight of the second petrochemical-based polymeric material, no greater than about 60% by weight of the second petrochemical-based polymeric material, no greater than about 55% by weight of the second petrochemical-based polymeric material, or no greater than about 50% by weight of the second petrochemical-based polymeric material. In an illustrative example when the mixture of materials includes a first petrochemical-based polymeric material and a second petrochemical-based polymeric material, the mixture of materials can include from about 20% by weight to about 80% by weight of the second petrochemical-based polymeric material. In another illustrative example when the mixture of materials includes a first petrochemical-based polymeric material and a second petrochemical-based polymeric material, the mixture of materials can include from about 35% by weight to about 60% by weight of the second petrochemical-based polymeric material. In an additional illustrative example when the mixture of materials includes a first petrochemical-based polymeric material and a second petrochemical-based polymeric material, the mixture of materials can include from about 45% by weight to about 55% by weight of the second petrochemical-based polymeric material.

In particular implementations when the mixture of materials includes a first petrochemical-based polymeric material and a second petrochemical-based polymeric material, the mixture of materials can include from about 5% by weight to about 25% by weight of the first petrochemical-based polymeric material and from about 40% by weight to about 60% by weight of the second petrochemical-based polymeric material. In other implementations when the mixture of materials includes a first petrochemical-based polymeric material and a second petrochemical-based polymeric material, the mixture of materials can include from about 10% by weight to about 20% by weight of the first petrochemical-based polymeric material and from about 45% by weigh to about 55% by weight of the second petrochemical-based polymeric material.

In some embodiments, a compatibilizer can also be present in the mixture of materials. In a particular implementation, a compatibilizer can be mixed with the one or more petrochemical-based polymeric materials and the one or more carbohydrate-based polymeric materials and be included in the mixture of materials. The compatibilizer can be a modified polyolefin, such as a maleic anhydride grafted polypropylene, a maleic anhydride grafted polyethylene, a maleic anhydride grafted polybutene, or a combination thereof. The compatibilizer can also include an acrylate-based co-polymer. For example, the compatibilizer can include an ethylene methyl acrylate co-polymer, an ethylene butyl-acrylate co-polymer, or an ethylene ethyl acrylate co-polymer. Additionally, the compatibilizer can include a poly(vinyl acetate) based compatibilizer.

In an implementation, the mixture of materials can include at least about 0.5% by weight of a compatibilizer, at least about 1% by weight of a compatibilizer, at least about 2% by weight of a compatibilizer, at least about 3% by weight of a compatibilizer, at least about 4% by weight of a compatibilizer, or at least about 5% by weight of a compatibilizer. Additionally, the mixture of materials can include no greater than about 10% by weight of a compatibilizer, no greater than about 9% by weight of a compatibilizer, no greater than about 8% by weight of a compatibilizer, no greater than about 7% by weight of a compatibilizer, or no greater than about 6% by weight of a compatibilizer. In an illustrative example, the mixture of materials can include from about 0.5% by weight to about 12% by weight of a compatibilizer. In another illustrative example, the mixture of materials can include from about 2% by weight to about 7% by weight of a compatibilizer. In an additional illustrative example, the mixture of materials can include from about 4% by weight to about 6% by weight of a compatibilizer.

In other implementations, the mixture of materials can include at least about 0.5% by weight of a compatibilizer, at least about 3% by weight of a compatibilizer, at least about 10% by weight of a compatibilizer, at least about 15% by weight of a compatibilizer, at least about 20% by weight of a compatibilizer, or at least about 25% by weight of a compatibilizer. In addition, the mixture of materials can include no greater than about 50% by weight of a compatibilizer, no greater than about 45% by weight of a compatibilizer, no greater than about 40% by weight of a compatibilizer, no greater than about 35% by weight of a compatibilizer, or no greater than about 30% by weight of a compatibilizer. In an illustrative example, the mixture of materials can include from about 0.1% by weight to about 50% by weight of a compatibilizer. In another illustrative example, the mixture of materials can include from about 1% by weight to about 35% by weight of a compatibilizer. In an additional illustrative example, the mixture of materials can include from about 2% by weight to about 15% by weight of a compatibilizer. In a further illustrative example, the mixture of materials can include from about 3% by weight to about 7% by weight of a compatibilizer.

Furthermore, other additives can be included in the mixture of materials. For example, additives that aid in the biodegradation of an article can be included in the mixture of materials, such as Restore® by Enso, EcoPure® by Bio-Tec Environmental, ECM Masterbatch Pellets 1M by ECM Biofilms, or Biodegradable 201 and/or Biodegradable 302 BioSphere®. Also, other additives that improve strength characteristics of the article can be added to the mixture of materials. Additives such as Biomax® Strong from Dupont can be used. In various embodiments, one or more additives can be included in the mixture of materials in an amount of at least about 0.5% by weight, at least about 1% by weight, at least about 1.5% by weight, at least about 2% by weight, at least about 2.5% by weight, at least about 3% by weight, or at least about 4% by weight. In further embodiments, one or more additives can be present in the mixture of materials in an amount of no greater than about 10% by weight, no greater than about 9% by weight, no greater than about 8% by weight, no greater than about 7% by weight, no greater than about 6% by weight, or no greater than about 5% by weight. In an illustrative example, one or more additives can be present in the mixture of materials in an amount from about 0.2% by weight to about 12% by weight. In another illustrative example, one or more additives can be present in the mixture of materials in an amount from about 1% by weight to about 10% by weight. In an additional example, one or more additives can be present in the mixture of materials in an amount from about 0.5% by weight to about 4% by weight. In a further illustrative example, one or more additives can be present in the mixture of materials in an amount from about 2% by weight to about 6% by weight.

At 108, the process 100 includes heating the mixture of materials. In an implementation, the mixture of materials can be heated at a temperature of at least about 100° C., at least about 110° C., at least about 115° C., at least about 120° C., at least about 125° C., at least about 130° C., at least about 135° C., at least about 140° C., or at least about 145° C. In another implementation, the mixture of materials can be heated at a temperature no greater than about 200° C., no greater than about 190° C., no greater than about 180° C., no greater than about 175° C., no greater than about 170° C., no greater than about 165° C., no greater than about 160° C., no greater than about 155° C., or no greater than about 150° C. In an illustrative example, the mixture of materials can be heated at a temperature from about 95° C. to about 205° C. In another illustrative example, the mixture of materials can be heated at a temperature from about 120° C. to about 180° C. In an additional illustrative example, the mixture of materials can be heated at a temperature from about 125° C. to about 165° C.

The mixture of materials can be heated in one or more chambers of an extruder. In some cases, one or more chambers of the extruder can be heated at different temperatures. In other cases, one or more chambers of the extruder can be heated at substantially a same temperature. In various embodiments, the extruder can have at least one chamber, at least two chambers, at least three chambers, at least four chambers, at least five chambers, at least six chambers, at least seven chambers, at least eight chambers, at least nine chambers, or at least ten chambers. In other embodiments, the extruder can have one chamber, two chambers, three chambers, four chambers, five chambers, six chambers, seven chambers, eight chambers, nine chambers, or ten chambers. In further embodiments, the extruder can have less than three chambers, less than four chambers, less than five chambers, less than six chambers, less than seven chambers, less than eight chambers, less than nine chambers, or less than ten chambers.

The speed of one or more screws of the extruder can be at least about 10 rotations per minute (rpm), at least about 12 rpm, at least about 14 rpm, at least about 16 rpm, or at least about 18 rpm. Additionally, the speed of one or more screws of the extruder can be no greater than about 30 rpm, no greater than about 28 rpm, no greater than about 26 rpm, no greater than about 24 rpm, no greater than about 22 rpm, or no greater than about 20 rpm. In an illustrative example, the speed of one or more screws of the extruder can be from about 8 rpm to about 35 rpm. In another illustrative example, the speed of one or more screws of the extruder can be from about 12 rpm to about 25 rpm. In an additional illustrative example, the speed of one or more screws of the extruder can be from about 14 rpm to about 21 rpm.

At 110, an article is produced using the mixture of materials. In some cases, the article can include a film. In other cases, the article can be formed from a film. In still additional situations, the article can have a shape based on a design, such as a mold. In some cases, when the article is a film, the film can be formed using a dye and injecting a gas into the heated mixture of material to form the film. The film can then be molded and/or modified to be in the form of a bag or other article.

In an implementation, the article can have from about 10% by weight to about 95% by weight of one or more petrochemical-based polymeric materials, from about 20% by weight to about 80% by weight of one or more petrochemical-based polymeric materials, from about 30% by weight to about 70% by weight of one or more petrochemical-based polymeric materials, or from about 40% by weight to about 60% by weight of one or more petrochemical-based polymeric materials. In an illustrative example, the article can have from about 60% by weight to about 80% by weight of one or more petrochemical-based polymeric materials. In some cases, the article can include a mixture of a first petrochemical-based polymeric material and a second petrochemical-based polymeric material, where the second petrochemical-based polymeric material is compostable. In these situations, the article can include from about 5% by weight to about 30% by weight of the first petrochemical-based polymeric material and from about 35% by weight to about 60% by weight of the second petrochemical-based polymeric material. In another implementation, the article can include from about 10% by weight to about 20% by weight of the first petrochemical-based polymeric material and from about 45% by weight to about 55% by weight of the second petrochemical-based polymeric material.

Additionally, the article can have from about 10% by weight to about 98% by weight of one of more carbohydrate-based polymeric materials, from about 20% by weight to about 80% by weight of one or more carbohydrate-based polymeric materials, from about 30% by weight to about 70% by weight of one or more carbohydrate-based polymeric materials, or from about 40% by weight to about 60% by weight of one or more carbohydrate-based polymeric materials. In an illustrative example, the article can include from about 15% by weight to about 30% by weight of one or more carbohydrate-based polymeric materials. In another illustrative example, the article can include from about 10% by weight to about 25% by weight of one or more carbohydrate-based polymeric materials. In a particular implementation, the article can include at least about 95% by weight of one or more carbohydrate-based polymeric materials or at least about 99% by weight of one or more carbohydrate-based polymeric materials.

In embodiments where the article is a film, the film can be comprised of a single layer, in some cases, and multiple layers, in other cases. One or more layers of the film can have a thickness of at least about 0.01 mm, at least about 0.02 mm, at least about 0.03 mm, at least about 0.05 mm, at least about 0.07 mm, at least about 0.10 mm, at least 0.2 mm, at least about 0.5 mm, at least about 0.7 mm, at least about 1 mm, at least about 2 mm, or at least about 5 mm. Additionally, when the article is a film, one or more layers of the film can have a thickness of no greater than about 2 cm, no greater than about 1.5 cm, no greater than about 1 cm, no greater than about 0.5 cm, no greater than about 100 mm, no greater than about 80 mm, no greater than about 60 mm, no greater than about 40 mm, no greater than about 30 mm, no greater than about 20 mm, or no greater than about 10 mm. In an illustrative example, when the article is a film, one or more layers of the film can have a thickness from about 0.005 mm to about 3 cm. In another illustrative example, when the article is a film, one or more layers of the film can have a thickness from about 0.01 mm to about 1 mm. In an additional illustrative example, when the article is a film, one or more layers of the film can have a thickness from about 0.05 mm to about 0.5 mm. In a further illustrative example, when the article is a film, one or more layers of the film can have a thickness from about 0.02 mm to about 0.05 mm.

The article can have strength characteristics that are characterized through testing, such as a dart drop impact test (ASTM D 1709), tensile strength at break test (ASTM D882), tensile elongation at break test (ASTM D882), a secant modulus test (ASTM D882), and an Elmendorf Tear test (ASTM DI922). In an implementation, the article can have a dart drop impact test value of at least about 150 g, at least about 175 g, at least about 200 g, at least about 225 g, at least about 250 g, at least about 275 g, or at least about 300 g. In another implementation, the article can have a dart drop impact test value of no greater than about 400 g, no greater than about 375 g, no greater than about 350 g, or no greater than about 325 g. In an illustrative implementation, the article can have a dart drop impact test value from about 140 g to about 425 g. In another illustrative implementation, the article can have a dart drop impact test value from about 200 g to about 400 g. In an additional illustrative example, the article can have a dart drop impact test value from about 250 g to about 350 g. In a further illustrative example, the article can have a dart drop impact test value from about 265 g to about 330 g.

In an implementation, the article can have a tensile strength at break test value in the machine direction of at least about 3.5 kpsi, at least about 3.7 kpsi, at least about 3.9 kpsi, at least about 4.1 kpsi, at least about 4.3 kpsi, or at least about 4.5 kpsi. In another implementation, the article can have a tensile strength at break test value in the machine direction of no greater than about 5.5 kpsi, no greater than about 5.3 kpsi, no greater than about 5.1 kpsi, no greater than about 4.9 kpsi, or no greater than about 4.7 kpsi. In an illustrative example, the article can have a tensile strength at break test value in the machine direction from about 3.5 kpsi to about 5.5 kpsi. In another illustrative example, the article can have a tensile strength at break test value in the machine direction from about 4.1 kpsi to about 4.9 kpsi.

In an implementation, the article can have a tensile strength at break test value in the transverse direction of at least about 3.2 kpsi, at least about 3.4 kpsi, at least about 3.6 kpsi, at least about 3.8 kpsi, at least about 4.0 kpsi, or at least about 4.2 kpsi. In another implementation, the article can have a tensile strength at break test value in the transverse direction of no greater than about 5.7 kpsi, no greater than about 5.5 kpsi, no greater than about 5.3 kpsi, no greater than about 5.1 kpsi, no greater than about 4.9 kpsi, no greater than about 4.7 kpsi, or no greater than about 4.5 kpsi. In an illustrative example, the article can have a tensile strength at break test value in the transverse direction from about 3.2 kpsi to about 5.7 kpsi. In another illustrative example, the article can have a tensile strength at break test value in the transverse direction from about 3.6 kpsi to about 5.0 kpsi.

In an implementation, the article can have a tensile elongation at break test value in the machine direction of at least about 550%, at least about 560%, at least about 570%, at least about 580%, at least about 590%, at least about 600%, at least about 610%, or at least about 620%. In another implementation, the article can have a tensile elongation at break test value in the machine direction of no greater than about 725%, no greater than about 710%, no greater than about 700%, no greater than about 680%, no greater than about 665%, no greater than about 650%, or no greater than about 635%. In an illustrative example, the article can have a tensile elongation at break test value in the machine direction from about 550% to about 750%. In another illustrative example, the article can have a tensile elongation at break test value in the machine direction from about 600% to about 660%.

In an implementation, the article can have a tensile elongation at break test value in the transverse direction of at least about 575%, at least about 590%, at least about 600%, at least about 615%, at least about 630%, or at least about 645%. In another implementation, the article can have a tensile elongation at break test value in the transverse direction of no greater than about 770%, no greater than about 755%, no greater than about 740%, no greater than about 725%, no greater than about 710%, no greater than about 695%, or no greater than about 680%. In an illustrative example, the article can have a tensile elongation at break test value in the transverse direction from about 575% to about 775%. In another illustrative example, the article can have a tensile elongation at break test value in the transverse direction from about 625% to about 700%.

In an implementation, the article can have an Elmendorf tear force test value in the machine direction of at least about 280 g/mil, at least about 300 g/mil, at least about 320 g/mil, at least about 340 g/mil, or at least about 360 g/mil. In another implementation, the article can have an Elmendorf tear force test value in the machine direction of no greater than about 450 g/mil, no greater than about 430 g/mil, no greater than about 410 g/mil, no greater than about 390 g/mil, or no greater than about 370 g/mil. In an illustrative example, the article can have an Elmendorf tear force test value in the machine direction from about 275 g/mil to about 475 g/mil. In another Illustrative example, the article can have an Elmendorf tear force test value in the machine direction from about 325 g/mil to about 410 g/mil.

In an implementation, the article can have an Elmendorf tear force test value in the transverse direction of at least about 475 g/mil, at least about 490 g/mil, at least about 500 g/mil, at least about 525 g/mil, at least about 540 g/mil, or at least about 550 g/mil. In another implementation, the article can have an Elmendorf tear force test value in the transverse direction of no greater than about 700 g/mil, no greater than about 680 g/mil, no greater than about 650 g/mil, no greater than about 625 g/mil, no greater than about 600 g/mil, no greater than about 580 g/mil, or no greater than about 570 g/mil. In an illustrative example, the article can have an Elmendorf tear force test value in the transverse direction from about 475 g/mil to about 725 g/mil. In another illustrative example, the article can have an Elmendorf tear force test value in the transverse direction from about 490 g/mil to about 640 g/mil.

In an implementation, the article can have a secant modulus of elasticity test value in the machine direction of at least about 20 kpsi, at least about 22 kpsi, at least about 24 kpsi, at least about 26 kpsi, at least about 28 kpsi, or at least about 30 kpsi. In another implementation, the article can have a secant modulus of elasticity test value in the machine direction of no greater than about 40 kpsi, no greater than about 38 kpsi, no greater than about 36 kpsi, no greater than about 34 kpsi, or no greater than about 32 kpsi. In an illustrative example, the article can have a secant modulus of elasticity test value in the machine direction from about 20 kpsi to about 40 kpsi. In another illustrative example, the article can have a secant modulus of elasticity test value in the machine direction from about 25 kpsi to about 35 kpsi.

In an implementation, the article can have a secant modulus of elasticity test value in the transverse direction of at least about 20 kpsi, at least about 22 kpsi, at least about 24 kpsi, at least about 26 kpsi, at least about 28 kpsi, or at least about 30 kpsi. In another implementation, the article can have a secant modulus of elasticity test value in the transverse direction of no greater than about 40 kpsi, no greater than about 38 kpsi, no greater than about 36 kpsi, no greater than about 34 kpsi, or no greater than about 32 kpsi. In an illustrative example, the article can have a secant modulus of elasticity test value in the transverse direction from about 20 kpsi to about 40 kpsi. In another illustrative example, the article can have a secant modulus of elasticity test value in the transverse direction from about 25 kpsi to about 35 kpsi.

In some cases, articles formed from a mixture of two or more starches have values of strength properties that are greater than articles formed from a single starch. For example, an article including a mixture of two or more starches can have a dart drop impact test value that is at least about 110% greater than an article including a single starch, at least about 125% greater than an article including a single starch, at least about 150% greater than an article including a single starch, at least about 175% greater than an article including a single starch, or at least about 190% greater than an article including a single starch. In another example, an article including a mixture of two or more starches can have a dart drop impact test value that is no greater than at least about 250% greater than an article including a single starch, no greater than at least about 240% greater than an article including a single starch, no greater than at least about 230% greater than an article including a single starch, no greater than at least about 230% greater than an article including a single starch, no greater than at least about 220% greater than an article including a single starch, or no greater than at least about 210% greater than an article including a single starch. In an illustrative example, an article including a mixture of two or more starches can have a dart drop impact test value that is from at least about 110% to about 250% greater than an article including a single starch. In another illustrative example, an article including a mixture of two or more starches can have a dart drop impact test value that is from at least about 160% to about 220% greater than an article including a single starch.

In various embodiments, an article including a carbohydrate-based polymeric material including a mixture of a first starch and a second starch can have a strength test value that is greater than a strength test value of a first article including a first starch-based polymeric material including a single starch comprised of a first starch and a second strength test value of a second article including a second starch-based polymeric material including a single starch comprising the second starch. For example, an article including a carbohydrate-based polymeric material having a mixture of a first starch and a second starch can have a dart drop impact test value that is greater than a first dart drop impact test value of a first article including a first starch-based polymeric material including a single starch comprised of the first starch and a second dart drop impact test value of a second article including a second starch-based polymeric material including a single starch comprising the second starch.

In further implementations, an article including a carbohydrate-based polymeric material having a mixture of a first starch and a second starch can have a strength test value that is greater than a strength test value of an article formed from a petrochemical-based polymeric material without the carbohydrate-based polymeric material. For example, an article including a carbohydrate-based polymeric material including a mixture of a first starch and a second starch can have a tensile elongation at break test value in the machine direction that is greater than a tensile elongation at break test value in the machine direction of an article formed from a petrochemical-based polymeric material without the carbohydrate-based polymeric material.

In an implementation, when subjected to biodegradation testing, an article being substantially free of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 32 days of testing under a biomethane potential test from about 10% to about 22%. In another implementation, when subjected to biodegradation testing, an article being substantially free of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 62 days of testing under a biomethane potential test from about 25% to about 35%. In an additional implementation, when subjected to biodegradation testing, an article being substantially free of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 91 days of testing under a biomethane potential test from about 30% to about 40%.

The biomethane potential testing can determine the potential for anaerobic biodegradation based on methanogenesis as a percent of total methanogenesis potential. In some cases, the biomethane potential testing can be used to predict biodegradability of the tested samples according to the ASTM 5511 standard and the biomethane potential testing can be conducted using one or more conditions from the ASTM 5511 standard. For example, the biomethane potential testing can take place at a temperature of about 52° C. Additionally, the biomethane potential testing can have some conditions that are different from those of ASTM 5511. In an implementation, the biomethane potential testing can utilize an inoculum having from about 50% by weight water to about 60% by weight water and from about 40% by weight organic solids to about 50% by weight organic solids. In a particular illustrative example, the inoculum used in biomethane potential testing can have about 55% by weight water and about 45% by weight organic solids. Biomethane potential testing can also take place at other temperatures, such as from about 35° C. to about 55° C. or from about 40° C. to about 50° C.

In various implementations, an article being substantially free of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 91 days of testing under a biomethane potential test that is greater than an amount of the one or more carbohydrate based polymeric materials present in the article. For example, an amount of biodegradation of an article being substantially free of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 91 days of testing under a biomethane potential test that is from about 5% to about 60%, from about 10% to about 50%, or from about 15% to about 40% greater than the amount of the one or more carbohydrate-based polymeric materials present in the article.

In other implementations, an article being substantially free of a biodegradation enhancing additive and having from about 95% by weight to substantially all of one or more carbohydrate-based polymeric materials can have an amount of biodegradation after 32 days of testing under a biomethane potential test from about 30% to about 45%. Further, an article being substantially free of a biodegradation enhancing additive and having from about 95% by weight to substantially all of one or more carbohydrate-based polymeric materials can have an amount of biodegradation after 62 days of testing under a biomethane potential test from about 40% to about 55%. In additional implementations, an article being substantially free of a biodegradation enhancing additive and having from about 95% by weight to substantially all of one or more carbohydrate-based polymeric materials can have an amount of biodegradation after 91 days of testing under a biomethane potential test from about 48% to about 62%.

In addition, when subjected to biodegradation testing, an article having no greater than about 2% by weight of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 32 days of testing under a biomethane potential test from about 9% to about 20%. In another implementation, when subjected to biodegradation testing, an article having no greater than about 2% by weight of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 62 days of testing under a biomethane potential test from about 20% to about 32%. In an additional implementation, when subjected to biodegradation testing, an article having no greater than about 2% by weight of a biodegradation enhancing additive and having from about 20% by weight to about 40% by weight of one or more carbohydrate-based polymeric materials and from about 65% by weight to about 85% by weight of one or more petrochemical-based polymeric materials can have an amount of biodegradation after 91 days of testing under a biomethane potential test from about 37% to about 50%. In various situations, biodegradation test values can also be determined using ASTM standards, such as ASTM D6400, ASTM D5338, ASTM 5988, ASTM 5511, ASTM D7475, or ASTM 5526.

In addition, an article can be subjected to compostability testing. Compostability of articles can be performed in accordance with the ASTM D6400 test at the time of filing of this patent application. In some cases, phytotoxicity corresponding to the biodegradation of articles can be measured, biodegradation of articles can be measured, an elemental/metals analysis with regard to the articles can be performed, or a combination thereof.

Articles produced using the process 100 can pass the phytotoxicity component of the ASTM D6400 test. For example, a biomass in which the article has at least partially degraded can be used to germinate plant seeds, such as cucumber seeds and/or soybean seeds. The length of the germinated plant seeds can be measured and compared to a threshold length to determine if the article passes the phytotoxicity portion of the ASTM D6400 test. In a particular implementation, a length of a cucumber seed germinated in a biomass of an article produced according to the process 100 can be from about 58 mm to about 75 mm. Additionally, a length of a soybean seed germinated in a biomass of an article produced according to the process 100 can be from about 135 mm to about 175 mm.

As part of the elemental analysis component of the ASTM D6400 test, an analysis of elements included in a biomass of articles produced using the process 100 can be performed. For example, amounts of at least the following elements can be measured: arsenic, cadmium, copper, lead, mercury, nickel, selenium, and zinc. The amounts measured for each of the elements can be compared to a threshold amount to determine whether the sample passed the elemental analysis portion of the ASTM D6400 test for the respective elements.

Also, when articles produced according to the process 100 are subjected to compostability testing under the ASTM D6400 standard, an amount of $CO_2$ emitted in the test chamber after 98 days can be measured and can be at least about 10% of theoretical maximum $CO_2$ emissions, at least about 12% of theoretical maximum $CO_2$ emissions, at least about 14% of theoretical maximum $CO_2$ emissions, at least about 16% of theoretical maximum $CO_2$ emissions, at least about 18% of theoretical maximum $CO_2$ emissions, at least about 20% of theoretical maximum $CO_2$ emissions, at least about 22% of theoretical maximum $CO_2$ emissions, at least about 24% of theoretical maximum $CO_2$ emissions, or at least about 26% of theoretical maximum $CO_2$ emissions. In addition, when articles produced according to the process 100 are subjected to compostability testing under the ASTM D6400 standard, an amount of $CO_2$ emitted in the test chamber after 98 days can be no greater than about 50% of theoretical maximum $CO_2$ emissions, no greater than about 48% of theoretical maximum $CO_2$ emissions, no greater than about 45% of theoretical maximum $CO_2$ emissions, no greater than about 42% of theoretical maximum $CO_2$ emissions, no greater than about 40% of theoretical maximum $CO_2$ emissions, no greater than about 38% of theoretical maximum $CO_2$ emissions, no greater than about 35% of theoretical maximum $CO_2$ emissions, no greater than about 32% of theoretical maximum $CO_2$ emissions, or no greater than about 30% of theoretical maximum $CO_2$ emissions. In an illustrative example, when articles produced according to the process 100 are subjected to compostability testing under the ASTM D6400 standard, an amount of $CO_2$ emitted in the test chamber after 98 days can be from about 8% of theoretical maximum $CO_2$ emissions to about 55% of theoretical maximum $CO_2$ emissions. In another illustrative example, when articles produced according to the process 100 are subjected to compostability testing under the ASTM D6400 standard, an amount of $CO_2$ emitted in the test chamber after 98 days can be from about 15% of theoretical maximum $CO_2$ emissions to about 35% of theoretical maximum $CO_2$ emissions. In an additional illustrative example, when articles produced according to the process 100 are subjected to compostability testing under the ASTM D6400 standard, an amount of $CO_2$ emitted in the test chamber after 98 days can be from about 18% of theoretical maximum $CO_2$ emissions to about 30% of theoretical maximum $CO_2$ emissions.

Additionally, when subjected to compostability testing under the ASTM D6400 standard, an amount of $CO_2$ emitted in the test chamber after 180 days can be at least about 35% of theoretical maximum $CO_2$ emissions, at least about 40% of theoretical maximum $CO_2$ emissions, at least about 45% of theoretical maximum $CO_2$ emissions, or at least about 50% of theoretical maximum $CO_2$ emissions, or at least about 55% of theoretical maximum $CO_2$ emissions. Further, when subjected to compostability testing under the ASTM D6400 standard, an amount of $CO_2$ emitted in the test chamber after 180 days can be no greater than about 85% of theoretical maximum $CO_2$ emissions, no greater than about 80% of theoretical maximum $CO_2$ emissions, no greater than about 75% of theoretical maximum $CO_2$ emissions, no greater than about 70% of theoretical maximum $CO_2$ emissions, no greater than about 65% of theoretical maximum $CO_2$ emissions, or no greater than about 60% of theoretical maximum $CO_2$ emissions. In an illustrative example, when articles produced according to the process 100 are subjected to compostability testing under the ASTM D6400 standard, an amount of $CO_2$ emitted in the test chamber after 180 days can be from about 38% of theoretical maximum $CO_2$ emissions to about 87% of theoretical maximum $CO_2$ emissions. In another illustrative example, when articles produced according to the process 100 are subjected to compostability testing under the ASTM D6400 standard, an amount of $CO_2$ emitted in the test chamber after 180 days can be from about 40% of theoretical maximum $CO_2$ emissions to about 60% of theoretical maximum $CO_2$ emissions. In an additional illustrative example, when articles produced according to the process 100 are subjected to compostability testing under the ASTM D6400 standard, an amount of $CO_2$ emitted in the test chamber after 180 days can be from about 42% of theoretical maximum $CO_2$ emissions to about 57% of theoretical maximum $CO_2$ emissions. In a further illustrative example, when articles produced according to the process 100 are subjected to compostability testing under the ASTM D6400 standard, an amount of $CO_2$ emitted in the test chamber after 180 days can be from about 70% of theoretical maximum $CO_2$ emissions to about 80% of theoretical maximum $CO_2$ emissions. In some instances, when articles produced according to the process 100 are subjected to compostability testing under the ASTM D6400 standard, an amount of $CO_2$ emitted in the test chamber after 180 days with respect to the theoretical maximum $CO_2$ emissions can be greater than the portion of the theoretical maximum amount of $CO_2$ that can be attributed to an amount of a starch-based polymeric material included in the articles. Thus, an amount of the $CO_2$ emitted in the chamber after 180 days can be attributed to an amount of a non-compostable petrochemical-based polymeric material under the ASTM D6400 standard.

Although FIG. 1 illustrates one illustrative example of certain steps of a process usable for producing an article as disclosed herein, it is to be appreciated that the configuration and inclusion of certain steps shown in FIG. 1 is only one example. Although the process 100 has been described with respect to providing both one or more petrochemical-based polymeric materials and one or more carbohydrate-based materials, in some instances, the process 100 can be implemented without providing the one or more petrochemical-based polymeric materials. Thus, the article can be formed from the one or more carbohydrate-based polymeric materials. In these situations, substantially all of the article can comprise the one or more carbohydrate-based polymeric materials.

Figure 2:
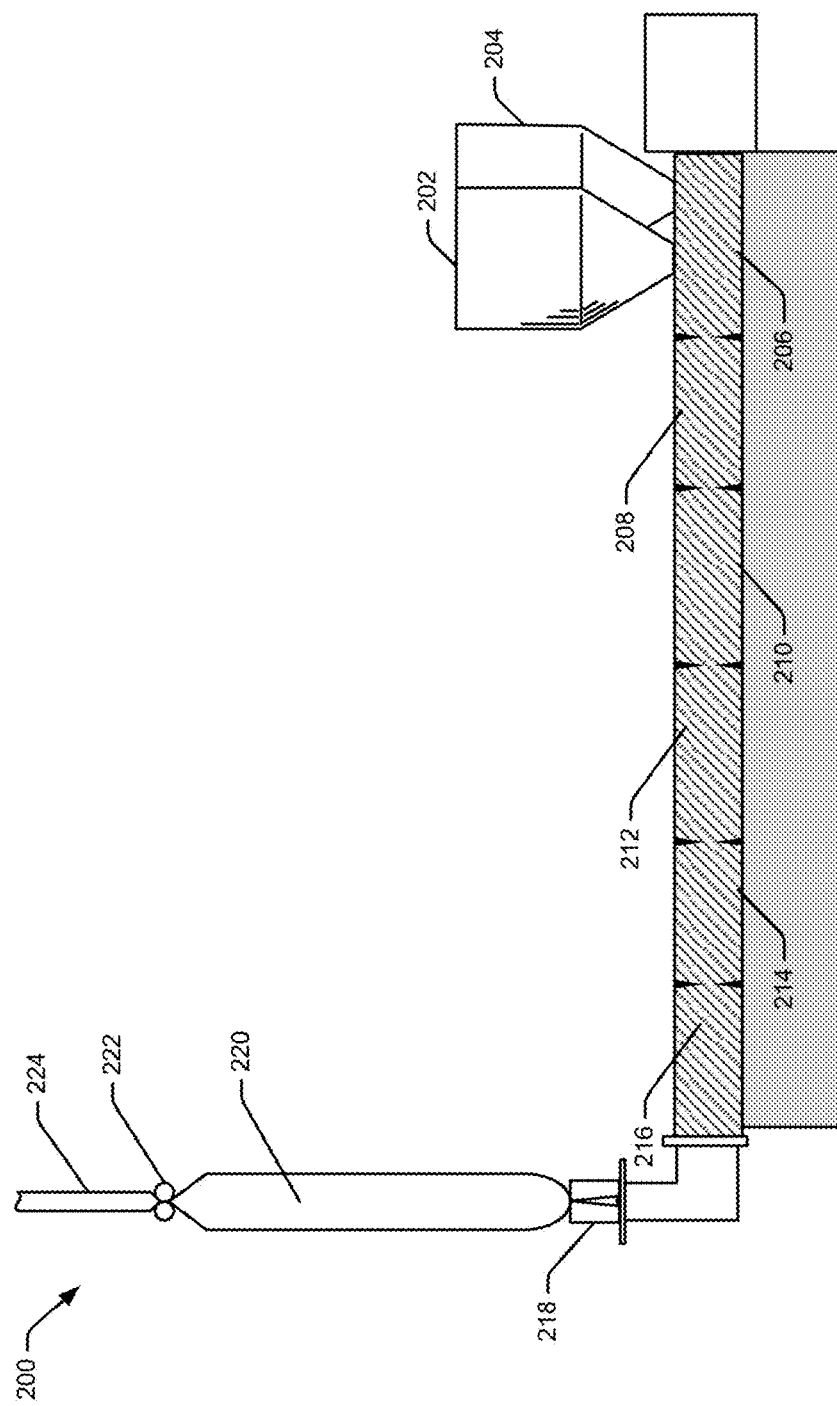
FIG. 2 illustrates components of an example manufacturing system to produce articles including biodegradable materials.

FIG. 2 illustrates components of an example manufacturing system 200 to produce articles including biodegradable materials. In some cases, the manufacturing system 200 can be used in the process 100 of FIG. 1. In an illustrative example, the manufacturing system 200 is an extruder, such as a single screw extruder or a twin screw extruder.

In an implementation, one or more petrochemical-based polymeric materials and one or more carbohydrate-based polymeric materials are provided via a first hopper 202 and a second hopper 204. The one or more petrochemical-based polymeric materials can include one or more polyolefin-based polymeric materials. For example, the one or more petrochemical-based polymeric materials can include a polyethylene. Additionally, the one or more carbohydrate-based polymeric materials can include one or more starch-based polymeric materials. In various implementations, the one or more carbohydrate-based polymeric materials can include one or more carbohydrates. In a particular example, the one or more carbohydrates can include a mixture of starches. To illustrate, the one or more carbohydrate-based materials can include an amount of a first starch and an amount of a second starch. The first starch can be derived from one of potato, corn, or tapioca and the second starch can be derived from a different one of potato, corn, or tapioca. Furthermore, the one or more carbohydrate-based polymeric materials can include an amount of a third starch that is different from the first starch and the second starch. In some implementations, the one or more carbohydrate-based polymeric materials can include one or more plasticizers.

The one or more carbohydrate-based polymeric materials and the one or more petrochemical-based polymeric materials can be mixed in a first chamber 206 to produce a mixture of materials. In some cases, the mixture of materials can include from about 10% by weight to about 40% by weight of the one or more carbohydrate-based polymeric materials, from about 60% by weight to about 89% by weight of the one or more petrochemical-based polymeric materials, and from about 1% by weight to about 9% by weight of the one or more compatibilizers.

In the example implementation shown in FIG. 2, the mixture of materials can pass through a number of chambers, such as the first chamber 206, a second chamber 208, a third chamber 210, a fourth chamber 212, a fifth chamber 214, and an optional sixth chamber 216. The mixture of materials can be heated in the chambers 206, 208, 210, 212, 214, 216. In some cases, a temperature of one of the chambers can be different from a temperature of another one of the chambers. In an illustrative example, the first chamber 206 is heated at a temperature between about 120° C. and about 140° C.; the second chamber 208 is heated at a temperature between about 130° C. and about 160° C.; the third chamber 210 is heated at a temperature between about 135° C. and about 165° C.; the fourth chamber 212 is heated at a temperature between about 140° C. and about 170° C.; the fifth chamber 214 is heated at a temperature between about 145° C. and about 180° C.; and the optional sixth chamber 216 is heated at a temperature between about 145° C. and about 180° C.

The heated mixture can then be extruded using a dye 218 to form an extruded object, such as a film. A gas can be injected into the extruded object to expand it with a pressure between about 105 bar and about 140 bar. The resulting tube 220 can be drawn up through rollers 222 to create a film 224 with a thickness between about 0.02 mm and 0.05 mm. In some cases, the film 224 can be comprised of a single layer. In other cases, the film 224 can be comprised of multiple layers For example, the film 224 can be comprised of at least 2 layers, at least 4 layers, or at least 6 layers. Additionally, the film 224 can be comprised of no greater than about 12 layers, no greater than about 10 layers, or no greater than about 8 layers.

Optionally, the film 224 can be formed into one or more bags. A bag formed from the film 224 can have a thickness from about 0.02 mm to about 0.05 mm. The bag can also include a cavity for holding items. In a particular implementation, a cavity of a bag formed from the film 224 can have a volume of at least about 0.1 L, at least about 0.5 L, at least about 1 L, at least about 2 L, or at least about 5 L. Additionally, a cavity of a bag formed from the film 224 can have a volume no greater than about 100 L, no greater than about 75 L, no greater than about 50 L. In an illustrative example, a cavity of a bag formed from the film 224 can have a volume from about 1 L to about 100 L. In another illustrative example, a cavity of a bag formed from the film 224 can have a volume from about 5 L to about 20 L.

In an implementation, the film 224 can be formed from a starch-based polymeric material. In some cases, the starch-based polymeric material can include a single starch. In other cases, the starch-based polymeric material can include a mixture of starches. In some cases, the starch-based polymeric material can include from about 70% by weight to about 90% by weight of the single starch or the mixture of starches. Additionally, the starch-based polymeric material can include from about 10% by weight to about 30% by weight of a plasticizer, such as glycerin. The starch-based polymeric material can also include from about 0.4% by weight to about 1.5% by weight water.

In one example, the film 224 can be formed from a starch-based polymeric material that has from about 15% by weight to about 25% by weight of a first starch, from about 15% by weight to about 25% by weight of a second starch, and from about 55% by weight to about 65% by weight of a third starch. In an illustrative example, the first starch can include potato starch, the second starch can include corn starch, and the third starch can include tapioca starch. In another illustrative example, the first starch can include tapioca starch, the second starch can include corn starch, and the third starch can include potato starch. In an additional illustrative example, the first starch can include tapioca starch, the second starch can include potato starch, and the third starch can include corn starch.

In other implementations, the film 224 can be formed from a starch-based polymeric material that has from about 27% by weight to about 36% by weight of a first starch, from about 27% by weight to about 36% by weight of a second starch, and from about 27% by weight to about 36% by weight of a third starch. In an illustrative example, the first starch can include corn starch, the second starch can include potato starch, and the third starch can include tapioca starch.

In various implementations, the film 224 can be formed from a starch-based polymeric material that has from about 15% by weight to about 25% by weight of a first starch and from about 75% by weight to about 85% by weight of a second starch. In an illustrative example, the first starch can include corn starch and the second starch can include potato starch or tapioca starch. In another illustrative example, the first starch can include potato starch and the second starch can include corn starch or tapioca starch. In an additional illustrative example, the first starch can include tapioca starch and the second starch can include corn starch or potato starch.

In addition to the starch-based polymeric material, the film 224 can be formed from a polyethylene-containing polymeric material. In an implementation, the film 224 can be formed from about 20% by weight to about 35% by weight of the starch-based polymeric material and from about 60% by weight to about 75% by weight of the polyethylene-containing polymeric material. Furthermore, the film 224 can be formed from about 3% by weight to about 7% by weight of a compatibilizer, such as a maleic anhydride-based compatibilizer.

In implementations where the film 224 is formed from an amount of a polyethylene-containing polymeric material and a starch-based polymeric material including a single starch, the film 224 can have a dart drop impact test value from about 140 g to about 420 g. Additionally, in implementations where the film 224 is formed from a polyethylene-containing polymeric material and a starch-based polymeric material including a mixture of starches, the film 224 can have a dart drop impact test value from about 250 g to about 350 g or from 265 g to about 335 g.

In some cases, when the film 224 includes a starch-based polymeric material including a mixture of starches, the film 224 can have a dart drop impact test value that is greater than a dart drop impact test value of a film including a starch-based polymeric material comprised of a single one of the starches in the mixture of starches. For example, in addition to including an amount of a petrochemical-based polymeric material, such as a polyolefin-based polymeric material, the film 224 can also include an amount of a carbohydrate-based polymeric material, such as an amount of a starch-based polymeric material having a mixture of a first starch and a second starch. In these cases, the film 224 can have a dart drop impact test value that is greater than a dart drop impact test value of a first article including the amount of the petrochemical-based polymeric material and a first starch-based polymeric material including a single starch comprised of the first starch. The film 224 can also have a dart drop impact test value that is greater than a dart drop impact test value of a second article including the amount of the petrochemical-based polymeric material and a second starch-based polymeric material including a single starch comprised of the second starch. When the film 224 includes a starch-based polymeric material including a mixture of the first starch, the second starch, and a third starch, the film 224 can have a dart drop impact test value that is greater than a dart drop impact test value of a third article including the amount of the petrochemical-based polymeric material and a third starch-based polymeric material including a single starch comprised of the third starch.

The amount of the first starch included in the first article, the amount of the second starch included in the second article, and/or the amount of the third starch included in the third article can be approximately the same as the amount of the starch-based polymeric material including the mixture of starches included in the film 224. To illustrate, when the film 224 includes about 25% by weight of the starch-based polymeric content that includes a mixture of starches, the first article, the second article, and/or the third article can include about 25% by weight of the single starch. Thus, the amount of the petrochemical-based polymeric content included in the film 224 and the first article, the second article, and the third article is approximately the same and the total amount of the starch-based polymeric content included in the film 224 and the first article, the second article, and the third article is approximately the same. Additionally, other components of the film 224, the first article, the second article, and the third article, such as a compatibilizer, can also be approximately the same. In these situations, the film 224 differs from the first article, the second article, and the third article because the starch-based polymeric content of the film 224 is comprised of multiple starches, while the starch-based polymeric content of the first article, the second article, and the third article is comprised of a single starch.

Also, the film 224 can have a tensile elongation at break value in the machine direction from about 600% to about 670% and a tensile elongation at break value in the transverse direction from about 625% to about 700%. In particular, the film 224 can have a tensile elongation at break in the machine direction that is greater than a tensile elongation at break value in the machine direction of an article that is formed from one or more polyolefin-based polymeric materials and free of starch-based polymeric materials. Furthermore, in implementations where the film 224 is formed from a polyethylene-containing polymeric material and a starch-based polymeric material including a mixture of starches, the film 224 can have an Elmendorf tear force value in the machine direction from about 325 g/mil to about 410 g/mil and an Elmendorf tear force value in the transverse direction from about 490 g/mil to about 650 g/mil.

In a particular implementation, the film 224 can be substantially free of an additive to enhance biodegradation and be formed from about 22% by weight to about 27% by weight of a starch-based polymeric material including a mixture of starches and from about 67% by weight to about 73% by weight of a polyethylene-containing polymeric material. In these situations, the film 224 can have biodegradation from about 12% to about 20% according to biomethane potential testing after 32 days. In addition, after 62 days the film 224 can have biodegradation from about 26% to about 34% according to biomethane potential testing. Further, after 91 days, the film 224 can have biodegradation from about 30% to about 40% according to biomethane potential testing.

In an implementation, the film 224 can include polymeric content including one or more carbohydrate-based polymeric materials including one or more carbohydrates and one or more petrochemical-based polymeric materials where an amount of the polymeric content that degrades after 91 days measured according to biomethane potential testing is greater than an amount of the one or more carbohydrates. In a particular implementation, the film 224 can include a starch-based polymeric material including a first starch and a second starch and a polyolefin-based polymeric material where an amount of polymeric content that biodegrades after 91 days measured according to biomethane potential testing is greater than an amount of the first starch and the second starch. In some cases, substantially all of the starch-based polymeric material biodegrades after 91 days as measured according to biomethane potential testing. Further, an amount of biodegradation of the film 224 after 91 days measured according to biomethane potential testing can be from about 5% to about 60% greater than an amount of the starch-based polymeric material. In addition, an amount of polymeric content that biodegrades after 91 days measured according to biomethane potential testing can be from about 30% by weight to about 50% by weight. Also, an amount of polymeric content that biodegrades after 62 days measured according to biomethane potential testing can be from about 25% by weight to about 35% by weight. In various implementations, the film 224 can be substantially free of a biodegradation enhancing additive, while in other implementations, the film 224 can include from about 0.5% by weight to about 2.5% by weight of a biodegradation enhancing additive.

Additionally, the film 224 can include from about 20% by weight to about 40% by weight of one or more carbohydrate-based polymeric materials or from about 10% by weight to about 50% by weight of one or more carbohydrate-based polymeric materials. Also, the film 224 can include from about 65% by weight to about 85% by weight of one or more petrochemical-based polymeric materials or from about 60% by weight to about 90% by weight of one or more petrochemical-based polymeric materials. In some cases, the film 224 can include from about 1% by weight to about 9% by weight of a compatibilizer or from about 3% by weight to about 7% by weight of the compatibilizer.

In a particular implementation, the film 224 can include from about 20% by weight to about 40% by weight of one or more starch-based polymeric materials and from about 60% by weight to about 80% by weight of one or more polyolefin-based polymeric materials. In an illustrative implementation, the film 224 can include from about 20% by weight to about 30% by weight of the one or more starch-based polymeric materials and from about 65% by weight to about 75% by weight of one or more polyolefin-based polymeric materials. In some cases, the one or more starch-based polymeric materials can include a first starch and a second starch and the one or more starch-based polymeric materials can include from about 10% by weight to about 25% by weight of a first starch and from about 55% by weight to about 85% by weight of a second starch. In other implementations, the one or more starch-based polymeric materials can include from about 10% by weight to about 25% by weight of a first starch and from about 55% by weight to about 85% by weight of a second starch. In various implementations, the one or more starch-based polymeric materials can include a third starch and the third starch can comprise from about 10% by weight to about 25% by weight of the one or more starch-based polymeric materials.

Furthermore, the film 224 can be subjected to compostability testing under ASTM D6400 at the time of filing this patent application. In an implementation, the film 224 can have a thickness from about 0.035 mm to about 0.050 mm; have a composition including: from about 22% by weight to about 32% by weight of a starch-based polymeric material including a mixture of starches, an amount of a polyethylene-based polymeric material from about 65% by weight to about 75% by weight, an amount of a compatibilizer from about 3% by weight to about 6% by weight, and be substantially free of an additive to enhance biodegradation; and when the film 224 is subjected to compostability testing under ASTM D6400, an amount of $CO_2$ emitted in the test chamber after 98 days can be from about 18% of theoretical maximum $CO_2$ emissions to about 26% of theoretical maximum $CO_2$ emissions. In another implementation, the film 224 can have a thickness from about 0.03 mm to about 0.04 mm; have a composition including: from about 25% by weight to about 35% by weight of a starch-based polymeric material including a mixture of starches, an amount of a polyethylene-based polymeric material from about 60% by weight to about 70% by weight, an amount of a compatibilizer from about 3% by weight to about 6% by weight, and an amount of an additive to enhance biodegradation from about 0.5% by weight to about 2% by weight; and when the film 224 is subjected to compostability testing under ASTM D6400, an amount of $CO_2$ emitted in the test chamber after 98 days can be from about 29% of theoretical maximum $CO_2$ emissions to about 37% of theoretical maximum $CO_2$ emissions.

In an additional implementation, the film 224 can have a thickness from about 0.035 mm to about 0.050 mm; have a composition including: from about 22% by weight to about 32% by weight of a starch-based polymeric material including a mixture of starches, an amount of a polyethylene-based polymeric material from about 65% by weight to about 75% by weight, an amount of a compatibilizer from about 3% by weight to about 6% by weight, and be substantially free of an additive to enhance biodegradation; and when the film 224 is subjected to compostability testing under ASTM D6400, an amount of $CO_2$ emitted in the test chamber after 180 days can be from about 44% of theoretical maximum $CO_2$ emissions to about 52% of theoretical maximum $CO_2$ emissions. In a further implementation, the film 224 can have a thickness from about 0.03 mm to about 0.04 mm; have a composition including: from about 25% by weight to about 35% by weight of a starch-based polymeric material including a mixture of starches, an amount of a polyethylene-based polymeric material from about 60% by weight to about 70% by weight, an amount of a compatibilizer from about 3% by weight to about 6% by weight, and an amount of an additive to enhance biodegradation from about 0.5% by weight to about 2% by weight; and when the film 224 is subjected to compostability testing under ASTM D6400, an amount of $CO_2$ emitted in the test chamber after 180 days can be from about 50% of theoretical maximum $CO_2$ emissions to about 60% of theoretical maximum $CO_2$ emissions.

In other implementations, the film 224 can have a thickness from about 0.03 mm to about 0.04 mm; have a composition including: from about 25% by weight to about 35% by weight of a starch-based polymeric material including a mixture of starches, an amount of a polyethylene-based polymeric material from about 10% by weight to about 20% by weight, an amount of a compostable petrochemical-based polymeric material from about 45% by weight to about 55% by weight, an amount of a compatibilizer from about 3% by weight to about 5% by weight, and include from about 0.5% by weight to about 2% by weight of an additive to enhance biodegradation; and when the film 224 is subjected to compostability testing under ASTM D6400, an amount of $CO_2$ emitted in the test chamber after 98 days can be from about 25% of theoretical maximum $CO_2$ emissions to about 35% of theoretical maximum $CO_2$ emissions. In a further implementation, the film 224 can have a thickness from about 0.03 mm to about 0.04 mm; have a composition including: from about 25% by weight to about 35% by weight of a starch-based polymeric material including a mixture of starches, an amount of a polyethylene-based polymeric material from about 10% by weight to about 20% by weight, an amount of a compostable petrochemical-based polymeric material from about 45% by weight to about 55% by weight, an amount of a compatibilizer from about 3% by weight to about 5% by weight, and include from about 0.5% by weight to about 2% by weight of an additive to enhance biodegradation; and when the film 224 is subjected to compostability testing under ASTM D6400, an amount of $CO_2$ emitted in the test chamber after 180 days can be from about 70% of theoretical maximum $CO_2$ emissions to about 80% of theoretical maximum $CO_2$ emissions.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

The concepts described herein will be further described in the following examples with reference to the following figures, which do not limit the scope of the disclosure described in the claims.

EXAMPLES

Example 1

A starch-based polymer containing 27% tallow glycerin (99% pure glycerin), 73% starch, and <1% water was mixed with LLDPE and anhydride-modified LLDPE in proportions of 25%, 70%, and 5%, respectively, by weight. Eleven samples were prepared and blown into films. The temperature settings of the extruder used are shown in Table 1. B1, B2, B3, B4, and B5 refer to temperature settings at different locations of the barrel of the extruder and AD 1, D 1, and D2 refer to the temperature settings at different locations in the die section of the extruder.

TABLE 1

| Temperature | Extruder | | | | | | | |
|---|---|---|---|---|---|---|---|---|
| | B1 | B2 | B3 | B4 | B5 | AD1 | D1 | D2 |
| Set Value | 130 | 140 | 145 | 150 | 160 | 160 | 160 | 160 |

The extruder blow settings are shown in Table 2.

TABLE 2

| Blow | Extruder | | | | | |
|---|---|---|---|---|---|---|
| | Melt Temperature Setting (° C.) | Pressure (bar) | Screw RPM | Extruder Motor Setting (Amps) | Blower Speed | Take-Up Speed (meters/minute) |
| Set Value (Samples 1-11) | 148 | 132 | 17 | 32.0 | 0 | 7.0 |
| Set Value (Sample 12) | 147 | 115 | 17 | 32.0 | 0 | 7.0 |

The resulting films contained 6.5% glycerin, 18.5% starch, 70% LLDPE, and 5% anhydride-modified LLDPE. The films then were tested using a falling dart impact test according to ASTM D1709. The strength test results of these tests are shown in Table 3.

TABLE 3

| Sample No. | Film Thickness (Mil) | Dart Test |
|---|---|---|
| 1 | 1.535 | >387 |
| 2 | 1.50 | >387 |
| 3 | 1.50 | >387 |
| 4 | 1.50 | 347 |
| 5 | 1.45 | 347 |
| 6 | 1.55 | 387 |
| 7 | 1.55 | 387 |
| 8 | 1.50 | >387 |
| 9 | 1.55 | 387 |
| 10 | 1.55 | >387 |
| 11 | 1.50 | >387 |
| 12 | 2.00 | 227 |

Example 2

A starch-based polymer containing 27% tallow glycerin (99% pure glycerin), 73% starch, and <1% water was mixed with LLDPE and anhydride-modified LLDPE in proportions of 25%, 70%, and 5%, respectively, by weight. Two samples were prepared and blown into films. The temperature settings of the extruder used are shown in Table 4.

TABLE 4

| Temperature | Extruder | | | | | | | | |
|---|---|---|---|---|---|---|---|---|---|
| | B1 | B2 | B3 | B4 | B5 | B6 | AD1 | D1 | D2 |
| Set Value | 130 | 150 | 155 | 160 | 165 | 165 | 165 | 170 | 170 |

The extruder blow settings are shown in Table 5.

TABLE 5

| Blow | Extruder | | | | | |
|---|---|---|---|---|---|---|
| | Melt Temperature Setting (° C.) | Pressure (bar) | Screw RPM | Extruder Motor Setting (Amps) | Blower Speed | Take-Up Speed (meters/minute) |
| Set Value | 149 | 121 | 16.0 | 35.0 | 0 | 6.0 |

The resulting films contained 6.5% glycerin, 18.5% starch, 70% LLDPE, and 5% anhydride-modified LLDPE. The films then were tested using a falling dart impact test according to ASTM D1709. The strength test results of these tests are shown in Table 6.

TABLE 6

| Sample No. | Film Thickness (Mil) | Dart Test |
|---|---|---|
| 1 | 1.575 | 347 |
| 2 | 1.335 | 362 |

Example 3

In order to test the strength characteristics of various combinations of starch, 17 starch-based polymers containing 27% tallow glycerin (99% pure glycerin), 73% starch, and <1% water were mixed with LLDPE and anhydride-modified LLDPE in proportions of 25%, 70%, and 5%, respectively, by weight. The resulting mixtures were then extruded and blown into films. The resulting films contained 6.5% glycerin, 18.5% starch, 70% LLDPE, and 5% anhydride-modified LLDPE. The films were then tested using a falling dart drop impact test according to ASTM D 1709. The combinations of starches tested and strength test results are shown in Table 7. As can be seen from the results shown in Table 7, samples formed from a mixture of starches have a dart drop impact test value that is greater than the dart drop impact test value of samples formed from a single starch.

TABLE 7

| Sample No. | Water Content (Starch-based Polymers) | Starch content (%) | | | Thickness (mm) | | Dart Test |
|---|---|---|---|---|---|---|---|
| | | Potato | Corn | Tapioca | | | |
| 1 | 0.58 | 0 | 100 | 0 | 0.040 | 0.045 | 137 |
| 2 | 0.73 | 100 | 0 | 0 | 0.040 | 0.045 | 167 |
| 3 | 0.80 | 0 | 100 | 0 | 0.040 | 0.045 | 167 |
| 4 | 0.93 | 100 | 0 | 0 | 0.030 | 0.035 | 167 |
| 5 | 0.49 | 0 | 0 | 100 | 0.035 | 0.040 | 197 |
| 6 | 0.55 | 0 | 0 | 100 | 0.030 | 0.035 | 212 |
| 7 | 1.03 | 33.33 | 33.33 | 33.33 | 0.030 | 0.035 | 242 |
| 8 | 1.04 | 20 | 20 | 60 | 0.030 | 0.035 | 267 |
| 9 | 0.97 | 60 | 20 | 20 | 0.025 | 0.030 | 252 |
| 10 | 0.93 | 0 | 0 | 100 | 0.025 | 0.030 | 257 |
| 11 | 0.94 | 20 | 0 | 80 | 0.025 | 0.030 | 257 |
| 12 | 1.37 | 20 | 80 | 0 | 0.025 | 0.030 | 257 |
| 13 | 0.95 | 80 | 0 | 20 | 0.030 | 0.035 | 302 |
| 14 | 1.19 | 20 | 60 | 20 | 0.030 | 0.035 | 322 |
| 15 | 0.96 | 0 | 80 | 20 | 0.025 | 0.030 | 277 |
| 16 | 1.05 | 80 | 20 | 0 | 0.025 | 0.030 | 317 |
| 17 | 0.81 | 0 | 20 | 80 | 0.025 | 0.030 | 322 |

Example 4

Using the same protocols as described in Example 3, 11 combinations of starches were tested. Specifically, 11 starch-based polymers containing 27% tallow glycerin (99% pure glycerin), 73% starch, and <1% water were mixed with LLDPE and anhydride-modified LLDPE in proportions of 25%, 70%, and 5%, respectively, by weight. The resulting mixtures were then extruded and blown into films. The resulting films contained 6.5% glycerin, 18.5% starch, 70% LLDPE, and 5% anhydride-modified LLDPE. The films were then tested using a falling dart impact test according to ASTM D1709. The combinations of starches tested and strength test results are shown in Table 8. As with the results shown in Table 7, the results of Table 8 show that samples formed from a mixture of starches have dart drop impact test values that are greater than the dart drop impact test values of samples formed from a single starch.

TABLE 8

| Sample No. | Starch content (%) | | | Thickness (mm) | Dart Test |
|---|---|---|---|---|---|
| | Potato | Corn | Tapioca | | |
| 1 | 0 | 100 | 0 | 1.535 | 347 |
| 2 | 100 | 0 | 0 | 1.535 | 362 |
| 3 | 0 | 0 | 100 | 1.550 | 367 |
| 4 | 80 | 20 | 0 | 1.550 | 387 |
| 5 | 0 | 20 | 80 | 1.550 | 387 |
| 6 | 0 | 80 | 20 | 1.550 | 387 |
| 7 | 0 | 10 | 90 | 1.550 | 387 |
| 8 | 33.33 | 33.33 | 33.33 | 1.500 | 387 |
| 9 | 80 | 0 | 20 | 1.500 | 387 |
| 10 | 10 | 0 | 90 | 1.500 | 387 |
| 11 | 0 | 90 | 10 | 1.500 | 387 |

Example 5

A starch-based polymer containing 27% tallow glycerin (99% pure glycerin), 73% starch, and <1% water was mixed with LLDPE and anhydride-modified LLDPE in proportions of 25%, 70%, and 5%, respectively, by weight. The starch was a blend of 90% corn starch and 10% potato starch, by weight. The resulting mixture was then extruded and blown into a film. The resulting film contained 6.5% glycerin, 18.5% starch, 70% LLDPE, and 5% anhydride-modified LLDPE. For comparison purposes, a second film containing 100% LLDPE was also prepared. Using a variety of testing methods a number of strength characteristics were tested, the results of which are shown in Table 9. In Table 9, transverse directions is abbreviated (TD) and machine directions is abbreviated (MD). The results shown in Table 9 indicate that the sample formed from the starch-based polymer blend has values for some of the strength tests that are greater than the values for some of strength tests performed with respect to the LLDPE sample.

TABLE 9

| | Sample Form | Test Method | CP14102701 | LLDPE |
|---|---|---|---|---|
| Film Thickness (mil) | Film | | 1.35 | 1.35 |
| Mass Density (SG): | Film or Pellets | ASTM D792 | 1.04 | 0.92 |
| Secant Modulus TD, kpsi | Film | ASTM D882 | 30 +/− 1 | 37.7 +/− 2.2 |
| Secant Modulus MD, kpsi | Film | ASTM D882 | 30 +/− 1.3 | 32.1 +/− 2.4 |
| Tensile Strength MD Break, kpsi | Film | ASTM D882 | 4.5 +/− 0.4 | 4.4 +/− 0.2 |
| Tensile Strength TD Break, kpsi | Film | ASTM D882 | 4.3 +/− 0.7 | 4.7 +/− 1.1 |
| Tensile Elongation MD Break, % | Film | ASTM D882 | 632 +/− 27 | 571 +/− 25 |
| Tensile Elongation TD Break, % | Film | ASTM D882 | 664 +/− 32 | 651 +/− 65 |
| Elmendorf Tear MD, g/mil | Film | ASTM D1922 | 367 +/− 38 | 254 +/− 41 |
| Elmendorf Tear TD, g/mil | Film | ASTM D1922 | 568 +/− 70 | 481 +/− 41 |
| Dart Drop Impact | Film | ASTM D1709 | 320 +/− 10 | 175 +/− 10 |
| Barrier: OPV 23° C., 0% RH | Film | cc-25 mic/m$^2$ dat-atm $O_2$ | 2,916 +/− 49 | 4,346 +/− 130 |
| Barrier: MVPV 39° C., 100% RH | Film | gm/m$^2$ -day | 24 +/− 3 | 14 +/− 0 |
| Optical Transparency % | Film | ASTM D1746 | 7 +/− 1 | 44 +/− 1 |
| Heat Seal Strength | Film | 40 psi, 0.5 sec | 1,400 g/in | 1,497 g/in |
| Heat Seal Temperature Range | Film | | 130-180 C. | 130-180 C. |
| Melt Flow Rate | Pellets | ASTMD1238 | 0.47 g/10 min | 1.0 g/10 min |
| Bio content | Film or Pellets | | 25% | 0% |
| Water Content | Pellets | ASTMD6980 | 0.35% | 0% |

Example 6

Figure 3A:
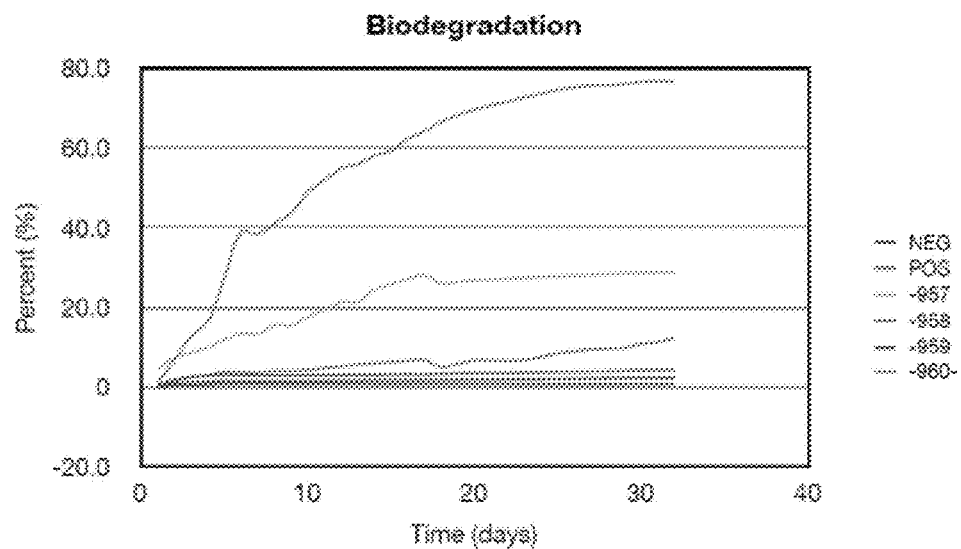
FIG. 3A and FIG. 3B illustrate percent biodegradation measured over 32 days according to biomethane potential testing of four samples formed according to techniques described herein.
Figure 3B:
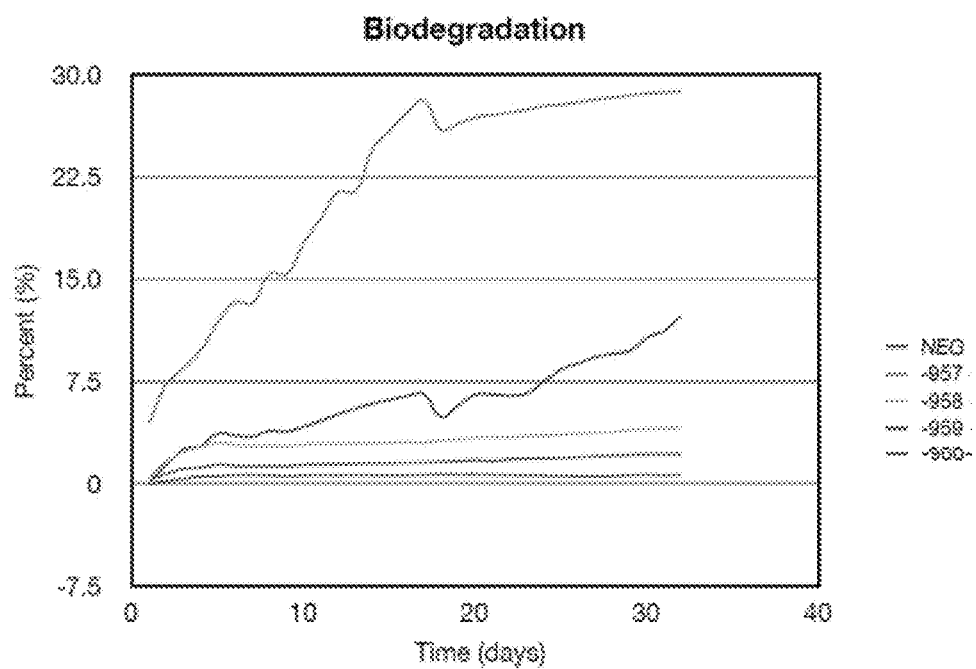

Seven samples were tested for 32 days to determine biodegradability characteristics using biomethane potential testing, to determine the potential for anaerobic biodegradation based on methanogenesis as a percent of total methanogenesis potential. The biomethane potential test was intended to replicate the conditions of a full-scale anaerobic digester (landfill). The biomethane potential test was conducted at a temperature of about 52° C. using an inoculum having about 55% by weight water and about 45% by weight organic solids. The positive control sample was cellulose and the negative control sample was untreated polyethylene. The results of four samples (referred to as 957, 958, 959, and 960) are shown in FIGS. 3A and 3B and in Table 10.

TABLE 10

|  | Inoculum | Negative | Positive | 957 | 958 | 959 | 960 |
|---|---|---|---|---|---|---|---|
| Cumulative Gas Volume (mL) | 729.6 | 962.5 | 8184.2 | 13366.8 | 2805.7 | 2995.4 | 5599.0 |
| Percent $CH_4$ (%) | 18.4 | 19.3 | 35.4 | 29.2 | 21.8 | 0.0 | 33.6 |
| Volume $CH_4$ (mL) | 134.2 | 185.5 | 2898.2 | 3904.4 | 612.4 | 0.0 | 1880.7 |
| Mass $CH_4$ (g) | 0.10 | 0.13 | 2.07 | 2.79 | 0.44 | 0.00 | 1.34 |
| Percent $CO_2$ (%) | 49.9 | 44.0 | 44.5 | 43.4 | 43.2 | 40.2 | 45.4 |
| Volume $CO_2$ (mL) | 364.0 | 423.3 | 3639.8 | 5799.9 | 1211.8 | 1204.2 | 2544.1 |
| Mass $CO_2$ (g) | 0.72 | 0.83 | 7.15 | 11.39 | 2.38 | 2.37 | 5.00 |
| Sample Mass (g) | 1,000 | 10 | 10 | 20.0 | 20.0 | 20 | 20 |
| Theoretical Sample Mass (g) | 0.0 | 8.6 | 4.2 | 17.1 | 17.1 | 17.1 | 17.1 |
| Biodegraded Mass (g) | 0.27 | 0.33 | 3.50 | 5.20 | 0.98 | 0.65 | 2.37 |
| Percent Biodegraded (%) |  | 0.7 | 76.7 | 28.8 | 4.1 | 2.2 | 12.3 |
| Adjusted Percent Biodegraded (%) |  | 0.9 | 100.0 | 37.5 | 5.4 | 2.9 | 16.0 |

Figure 4A:
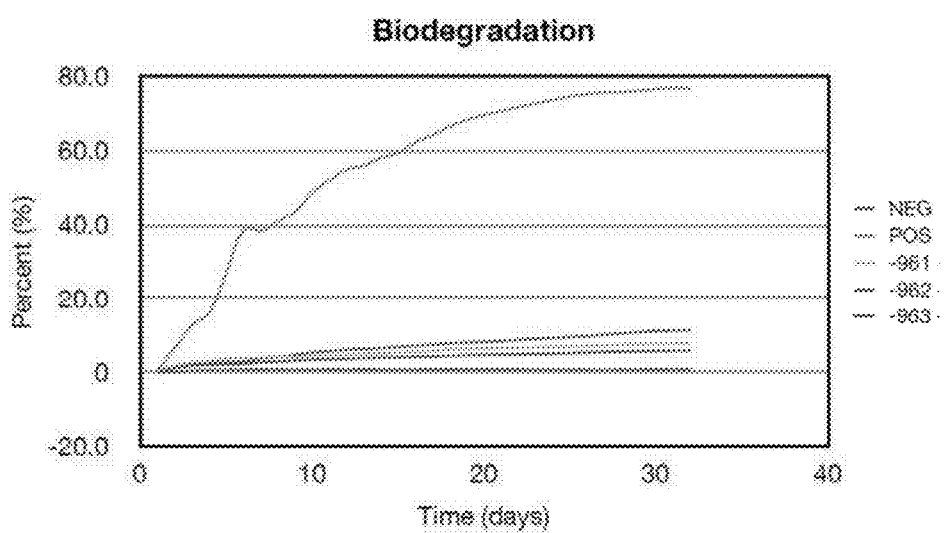
FIG. 4A and FIG. 4B illustrate percent biodegradation measured over 32 days according to biomethane potential testing of three additional samples formed according to techniques described herein.
Figure 4B:
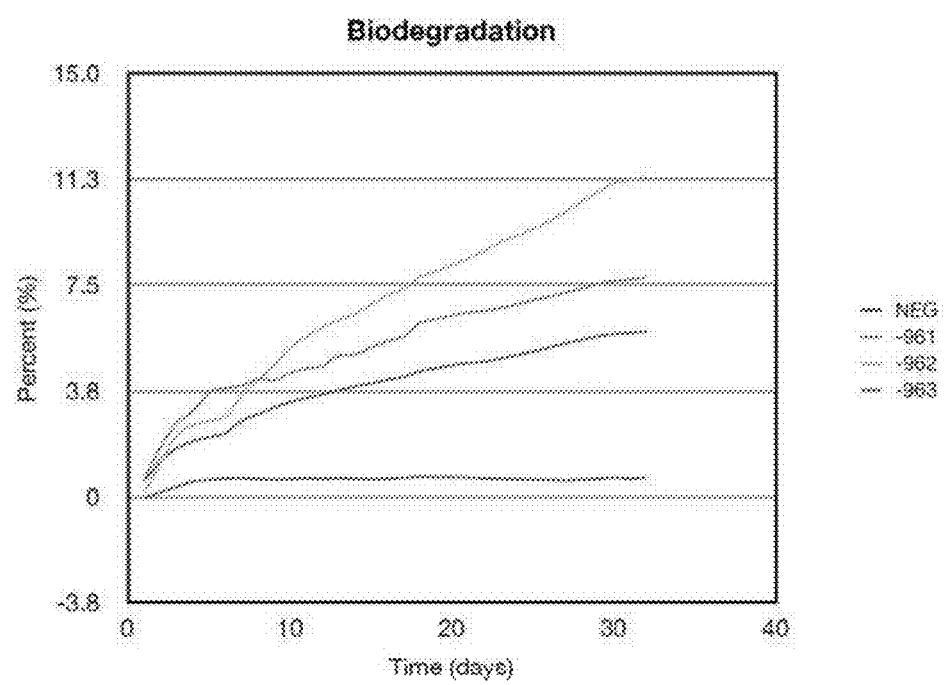

The results of biomethane potential testing for samples 961, 962, and 963 are shown in FIGS. 4A and 4B, and Table 11.

TABLE 11

|  | Inoculum | Negative | Positive | 961 | 962 | 963 |
|---|---|---|---|---|---|---|
| Cumulative Gas Volume (mL) | 729.6 | 962.5 | 8184.2 | 4286.4 | 5538.9 | 5796.5 |
| Percent $CH_4$ (%) | 18.4 | 19.3 | 35.4 | 27.1 | 31.8 | 0.0 |
| Volume $CH_4$ (mL) | 134.2 | 185.5 | 2898.2 | 1161.9 | 1759.5 | 0.0 |
| Mass $CH_4$ (g) | 0.10 | 0.13 | 2.07 | 0.83 | 1.26 | 0.00 |
| Percent $CO_2$ (%) | 49.9 | 44.0 | 44.5 | 42.5 | 42.7 | 40.9 |
| Volume $CO_2$ (mL) | 364.0 | 423.3 | 3639.8 | 1821.0 | 2363.9 | 2370.7 |
| Mass $CO_2$ (g) | 0.72 | 0.83 | 7.15 | 3.58 | 4.64 | 4.66 |
| Sample Mass (g) | 1,000 | 10 | 10 | 20.0 | 20.0 | 20 |
| Theoretical Sample Mass (g) | 0.0 | 8.6 | 4.2 | 17.1 | 17.1 | 17.1 |
| Biodegraded Mass (g) | 0.27 | 0.33 | 3.50 | 1.60 | 2.21 | 1.27 |
| Percent Biodegraded (%) |  | 0.7 | 76.7 | 7.8 | 11.3 | 5.9 |
| Adjusted Percent Biodegraded (%) |  | 0.9 | 100.0 | 10.1 | 14.8 | 7.6 |

The content and form of the samples tested can be found in Table 12. The starch-based polymer material included 27% glycerin (99% pure), 73% starch, and <1% water. "Ecoflex" refers to the Ecoflex® plastic product from BASF.

TABLE 12

| Sample No. | Starch-Based Polymer (%) | Polyethylene (%) | Ecoflex (%) | Maleic Anhydride Modified LLDPE (%) | Additive (%) | Biodegradation-Enhancing Additive | Form |
|---|---|---|---|---|---|---|---|
| 957 | 100 | 0 |  | 0 | 0 | — | Press-outs |
| 958 | 25 | 70 |  | 5 | 0 | — | Film |
| 959 | 30 | 65 |  | 5 | 0 | — | Film |
| 960 | 25 | 70 |  | 5 | 0 | — | Bag |
| 961 | 25 | 69 |  | 5 | 1 | Enso Restore | Film |
| 962 | 25 | 69.5 |  | 5 | 0.5 | Bio-B | Film |
| 963 | 30 | 15 | 20 | 5 | 0 | — | Film |

Example 7

Figure 5A:
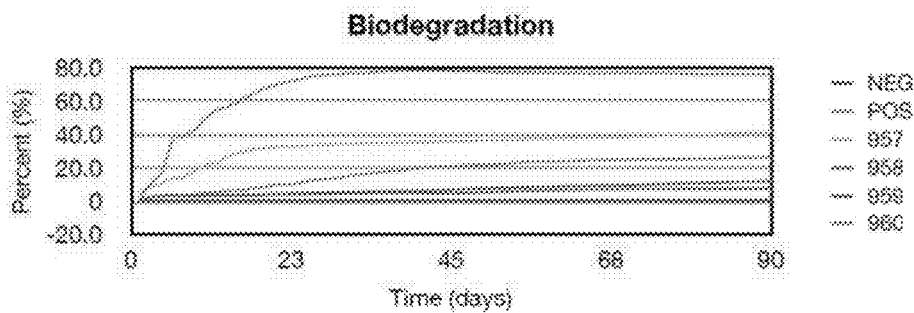
FIG. 5A and FIG. 5B illustrate percent biodegradation measured over 91 days according to biomethane potential testing of four samples formed according to techniques described herein.
Figure 5B:
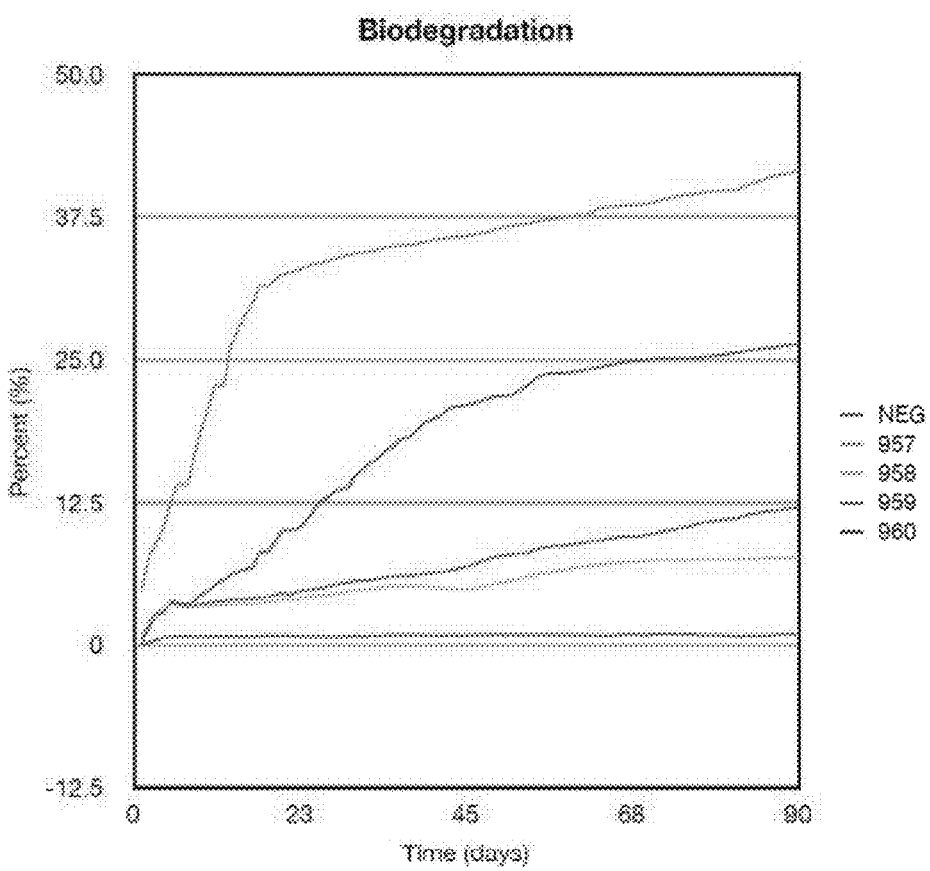

Seven samples were tested for 91 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The results of sample numbers 957, 958, 959, and 960 (compositions shown in Table 12) are shown in FIGS. 5A and 5B and in Table 13.

TABLE 13

|  | Inoculum | Negative | Positive | 957 | 958 | 959 | 960 |
|---|---|---|---|---|---|---|---|
| Cumulative Gas Volume (mL) | 811.3 | 1067.4 | 8211.9 | 18074.3 | 4045.8 | 5643.8 | 10915.8 |
| Percent $CH_4$ (%) | 22.3 | 23.2 | 35.5 | 34.7 | 32.7 | 29.4 | 42.2 |
| Volume $CH_4$ (mL) | 180.6 | 248.1 | 2914.5 | 6273.2 | 1321.2 | 2224.8 | 4608.8 |
| Mass $CH_4$ (g) | 0.13 | 0.18 | 2.08 | 4.48 | 0.94 | 1.59 | 3.29 |
| Percent $CO_2$ (%) | 48.4 | 43.1 | 44.4 | 42.6 | 42.1 | 39.7 | 40.3 |
| Volume $CO_2$ (mL) | 392.4 | 460.3 | 3469.4 | 7692.5 | 1703.2 | 2238.1 | 4401.5 |
| Mass $CO_2$ (g) | 0.77 | 0.90 | 7.17 | 15.11 | 3.35 | 4.40 | 8.65 |
| Sample Mass (g) | 1,000 | 10 | 10 | 20.0 | 20.0 | 20 | 20 |
| Theoretical Sample Mass (g) | 0.0 | 8.6 | 4.2 | 17.1 | 17.1 | 17.1 | 17.1 |
| Biodegraded Mass (g) | 0.31 | 0.38 | 3.52 | 7.48 | 1.62 | 2.39 | 4.83 |
| Percent Biodegraded (%) |  | 0.8 | 76.1 | 41.9 | 7.7 | 12.2 | 26.4 |
| Adjusted Percent Biodegraded (%) |  | 1.1 | 100.0 | 55.0 | 10.1 | 16.0 | 34.7 |

Figure 6A:
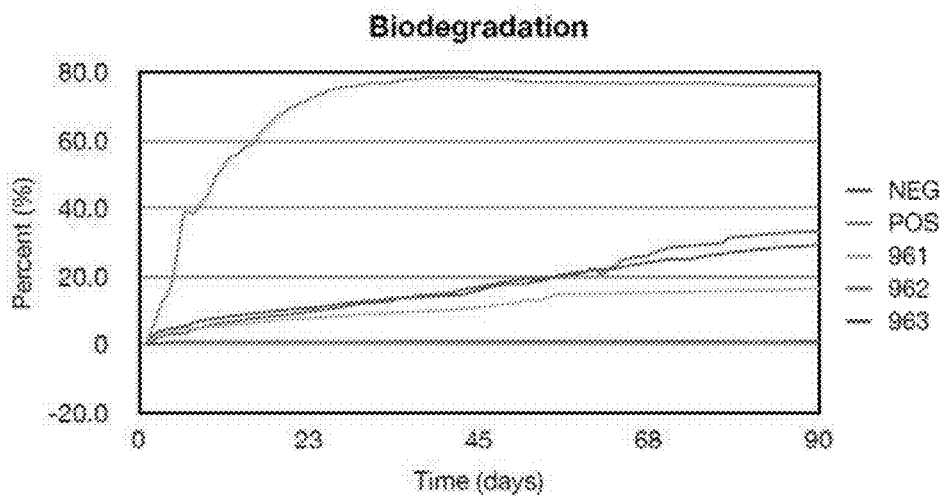
FIG. 6A and FIG. 6B illustrate percent biodegradation measured over 91 days according to biomethane potential testing of three additional samples formed according to techniques described herein.
Figure 6B:
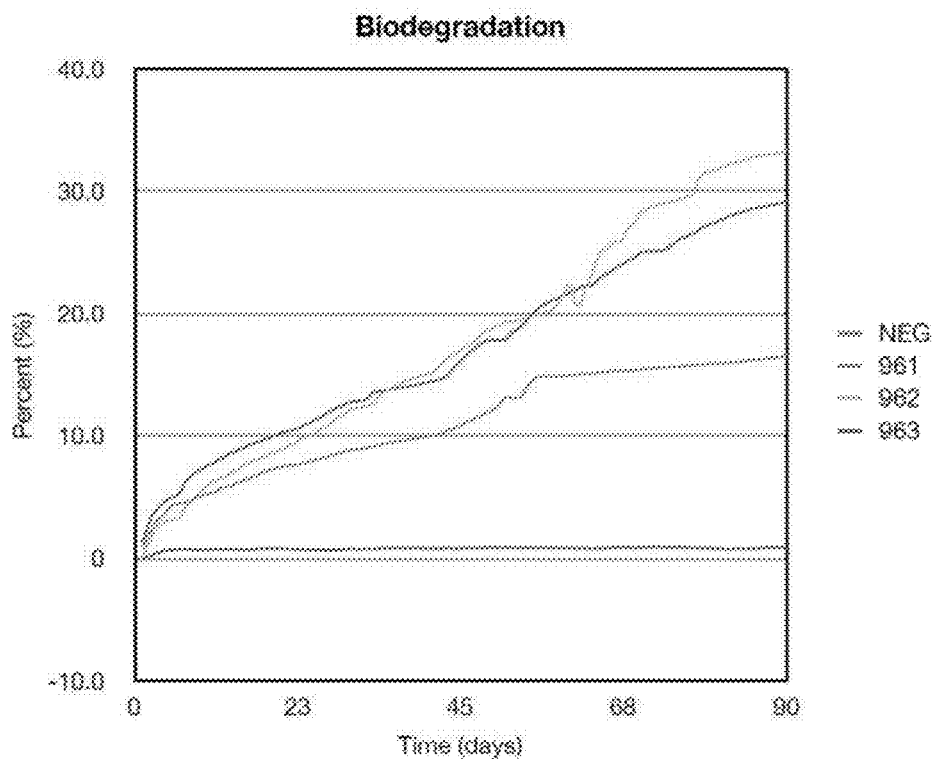

The biomethane potential testing results of sample numbers 961, 962, and 963 (compositions shown in Table 12) are shown in FIGS. 6A and 6B and in Table 14.

TABLE 14

|  | Inoculum | Negative | Positive | 961 | 962 | 963 |
|---|---|---|---|---|---|---|
| Cumulative Gas Volume (mL) | 811.3 | 1067.4 | 8211.9 | 7385.2 | 13059.8 | 11733.3 |
| Percent $CH_4$ (%) | 22.3 | 23.2 | 35.5 | 38.6 | 46.3 | 45.2 |
| Volume $CH_4$ (mL) | 180.6 | 248.1 | 2914.5 | 2849.9 | 6052.3 | 5302.2 |
| Mass $CH_4$ (g) | 0.13 | 0.18 | 2.08 | 2.04 | 4.32 | 3.79 |
| Percent $CO_2$ (%) | 48.4 | 43.1 | 44.4 | 40.9 | 39.8 | 39.6 |
| Volume $CO_2$ (mL) | 392.4 | 460.3 | 3649.4 | 3023.8 | 5197.1 | 4643.4 |
| Mass $CO_2$ (g) | 0.77 | 0.90 | 7.17 | 5.94 | 10.21 | 9.12 |
| Sample Mass (g) | 1,000 | 10 | 10 | 20.0 | 20.0 | 20 |
| Theoretical Sample Mass (g) | 0.0 | 8.6 | 4.2 | 17.1 | 17.1 | 17.1 |
| Biodegraded Mass (g) | 0.31 | 0.38 | 3.52 | 3.15 | 6.03 | 5.33 |
| Percent Biodegraded (%) |  | 0.8 | 76.1 | 16.6 | 33.4 | 29.3 |
| Adjusted Percent Biodegraded (%) |  | 1.1 | 100.1 | 21.8 | 43.9 | 38.5 |

Example 8

Figure 7A:
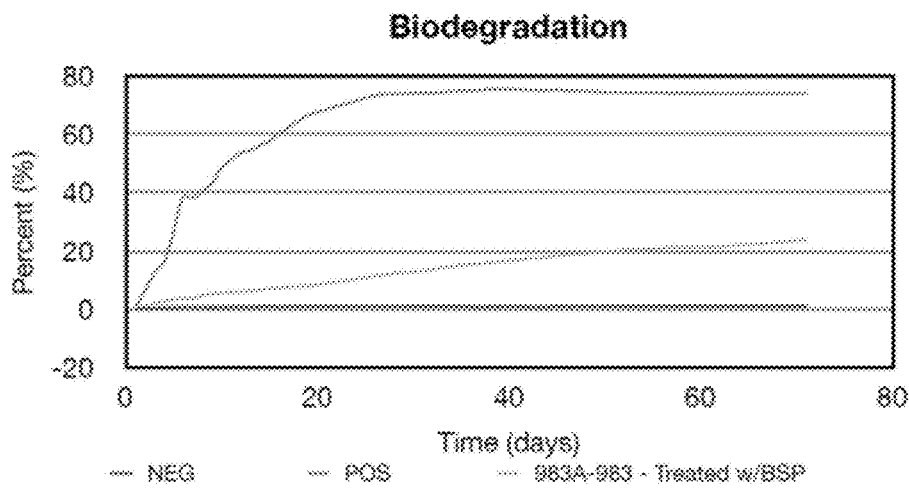
FIG. 7A and FIG. 7B illustrate percent biodegradation measured over 71 days according to biomethane potential testing of one sample formed according to techniques described herein.
Figure 7B:
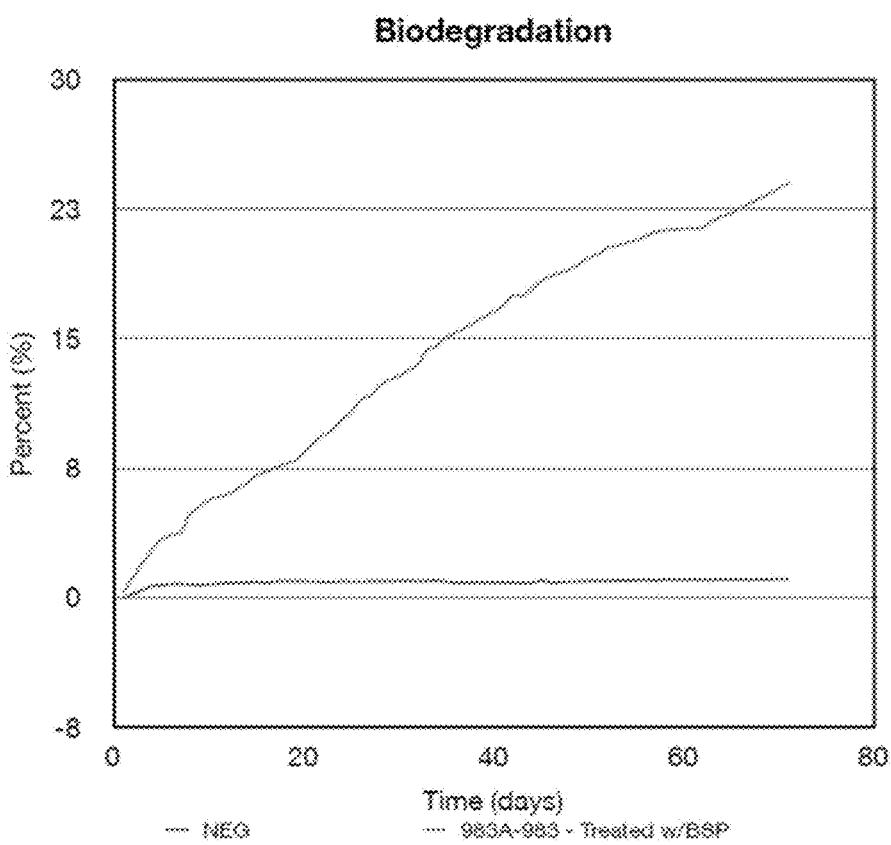

A film was tested for 71 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The film contained 25% starch-based polymer material (containing 27% glycerin (99% pure), 73% starch, and <1% water); 1% biosphere additive; 5% Maleic Anhydride compatibilizer; and 69% modified LLDPE. The results of the biomethane potential testing of sample number 983 are shown in FIGS. 7A and 7B and in Table 15.

TABLE 15

|  | Inoculum | Negative | Positive | 983 |
|---|---|---|---|---|
| Cumulative Gas Volume (mL) | 1021.1 | 1326.5 | 8225.8 | 10104.5 |
| Percent $CH_4$ (%) | 26.3 | 27.4 | 35.5 | 41.7 |
| Volume $CH_4$ (mL) | 268.4 | 363.3 | 2922.7 | 4214.4 |
| Mass $CH_4$ (g) | 0.19 | 0.26 | 2.09 | 3.01 |
| Percent $CO_2$ (%) | 47.6 | 42.3 | 44.4 | 41.9 |
| Volume $CO_2$ (mL) | 485.7 | 561.2 | 3654.2 | 4230.1 |
| Mass $CO_2$ (g) | 0.95 | 1.10 | 7.18 | 8.31 |
| Sample Mass (g) | 1,000 | 10 | 10 | 20.0 |
| Theoretical Sample Mass (g) | 0.0 | 8.6 | 4.2 | 17.1 |
| Biodegraded Mass (g) | 0.40 | 0.50 | 3.52 | 4.52 |
| Percent Biodegraded (%) |  | 1.1 | 73.9 | 24.0 |

TABLE 15-continued

|  | Inoculum | Negative | Positive | 983 |
|---|---|---|---|---|
| *Adjusted Percent Biodegraded (%) |  | 1.4 | 100.0 | 32.5 |

Example 9

Eight samples (sample numbers 957-963 and 983; compositions shown in Examples 5 and 7) were tested for 91 days to determine biodegradability characteristics using biomethane potential testing conducted at a temperature of about 52° C. using an inoculum having about 55% by weight water and about 45% by weight organic solids, to determine the potential for anaerobic biodegradation based on methanogenesis as a percent of total methanogenesis potential. The positive control sample was cellulose and the negative control sample was untreated polyethylene. The results are shown in Table 16. The results shown in Table 16 indicate that samples formed from a mixture of a starch-based polymer and a polyolefin based polymer biodegrades an amount that is greater than the amount of the starch-based polymer. In some cases, the sample that biodegraded more than an amount of the starch-based polymer present was free of a biodegradation enhancing additive.

TABLE 16

| | % Degraded | | | | |
|---|---|---|---|---|---|
| Item # | 32 Days | 42 Days | 62 Days | 71 Days | 91 Days |
| 957 | 37.50% |  | 48.40% |  | 55.00% |
| 958 | 5.40% |  | 8.10% |  | 10.10% |
| 959 | 2.90% |  | 11.30% |  | 16.00% |
| 960 | 16.00% |  | 30.00% |  | 34.70% |
| 961 | 10.10% |  | 19.40% |  | 21.80% |
| 962 | 14.80% |  | 26.40% |  | 43.90% |
| 963 | 7.60% |  | 28.10% |  | 38.50% |
| 983 |  | 19.20% |  | 32.50% |  |

Example 10

Four samples (sample numbers 100, 200, 300, and 400) were tested for compostability using the ASTM D6400 standard at the time of filing of this patent application. The ASTM D6400 standard specifies a phytotoxicity testing procedure, indicates that the biodegradation of articles is to be measured according to the ASTM D5338-11 test, and that an elemental analysis is to utilize Table 3 of 40 C.P.R. Part 503.13. The compositions of the samples and the biodegradation portion of the compostability test results are shown in Table 17. The starch-based polymeric material was a blend of starches including 90% corn starch and 10% potato starch. The first petrochemical-based polymeric material was a linear low-density polyethylene produced using a metallocene catalyst. The compatibilizer for samples 100 and 200 was a Bynel® compatibilizer from DuPont® and the compatibilizer for samples 300 and 400 was an Amplify™ compatibilizer from Dow®. The biodegradation enhancing additive for samples 100 and 200 was from Biosphere® and the biodegradation enhancing additive for sample 300 was from ENSO. The second petrochemical-based polymeric material was Ecoflex® from BASF, which is a fossil raw materials-based plastic that is compostable according to the ASTM D6400 standard. The 98 day biodegradability results indicated the test chamber carbon dioxide measurement as a percentage of a theoretical maximum amount of carbon dioxide for the sample after 98 days. The 180 day biodegradability results indicated the test chamber carbon dioxide measurement as a percentage of a theoretical maximum amount of carbon dioxide after 180 days.

Figure 8A:
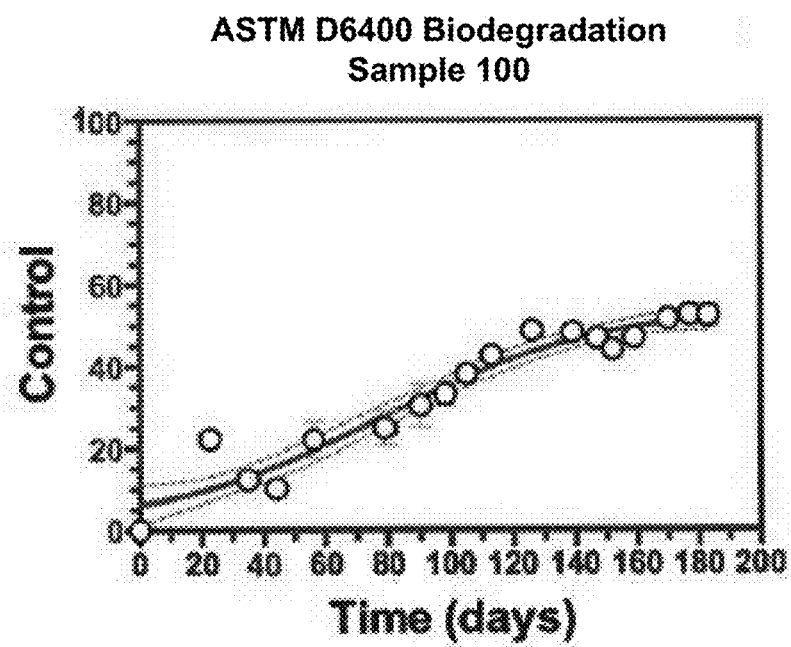
FIG. 8A and FIG. 8B show the results of the biodegradation portion of the ASTM D6400 test performed according to ASTM D5338 for a first sample and a second sample formed according to techniques described herein.
Figure 8B:
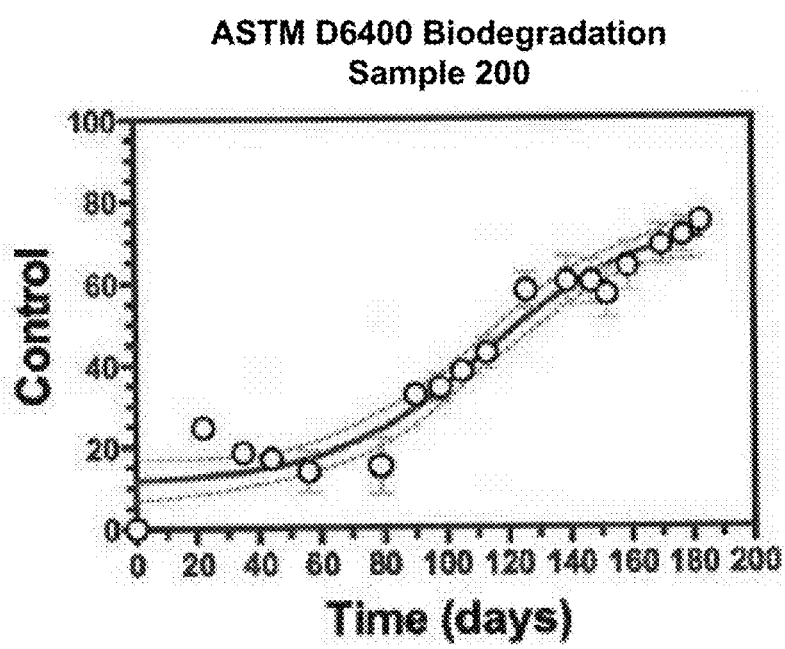
Figure 9A:
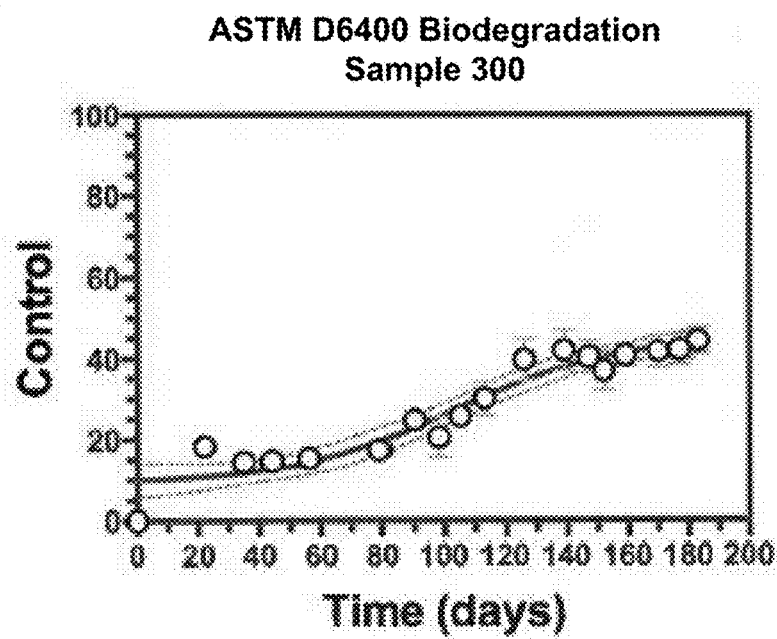
FIG. 9A and FIG. 9B show the results of the biodegradation portion of the ASTM D6400 test performed according to ASTM D5338 for a third sample and a fourth sample formed according to techniques described herein.
Figure 9B:
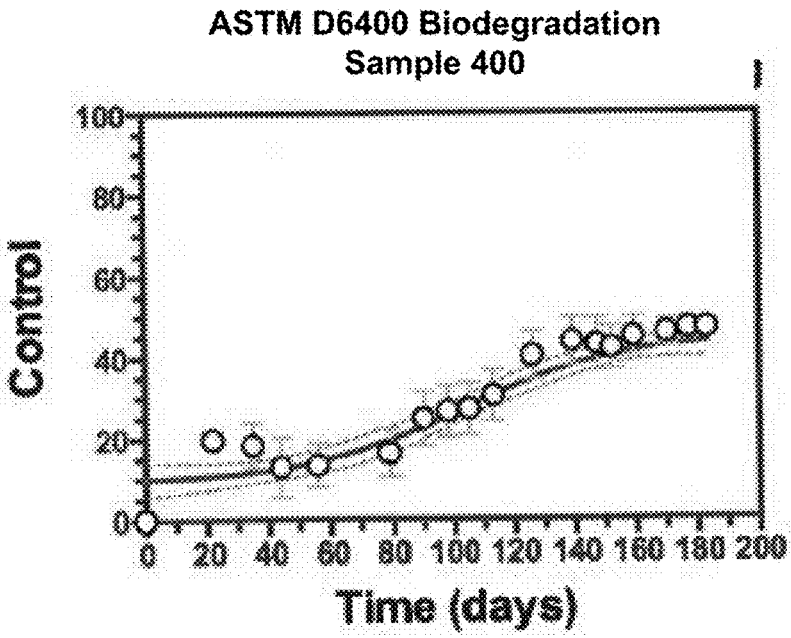

FIG. 8A shows the results of the biodegradation portion of the ASTM D6400 test performed according to ASTM D5338 for sample 100. FIG. 8B shows the results of the biodegradation portion of the ASTM D6400 test performed according to ASTM D5338 for sample 200. FIG. 9A shows the results of the biodegradation portion of the ASTM D6400 test performed according to ASTM D5338 for sample 300 and FIG. 9B shows the results of the biodegradation portion of the ASTM D6400 test performed according to ASTM D5338 for sample 400. The results of the biodegradation portion of the ASTM D6400 test indicate that, after 180 days, an amount of first petrochemical-based polymeric material in samples 100, 300, and 400 has degraded partially because the amount of carbon dioxide measured in the test chamber is greater than the percentage of the starch-based polymeric material included in these samples. Thus, at least a portion of the remainder of the carbon dioxide emissions is due to the degradation of the first petrochemical-based polymeric material. This observations includes sample 400, which is free of a biodegradation enhancing additive.

Figure 10:
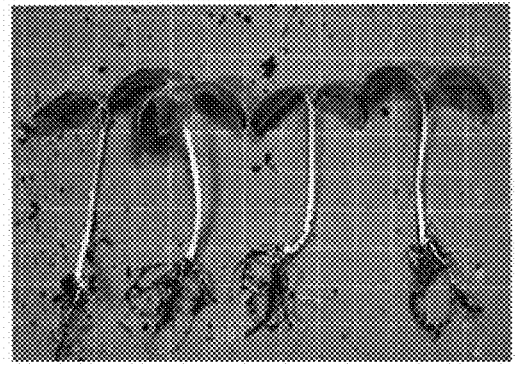
FIG. 10 shows the results of the phytotoxicity portion of the ASTM D6400 test for a first sample formed according to techniques described herein.
Figure 10:
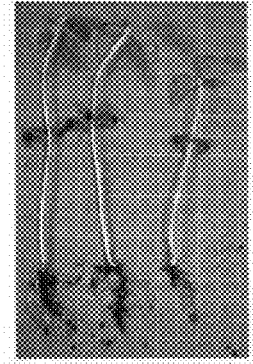
Figure 11:
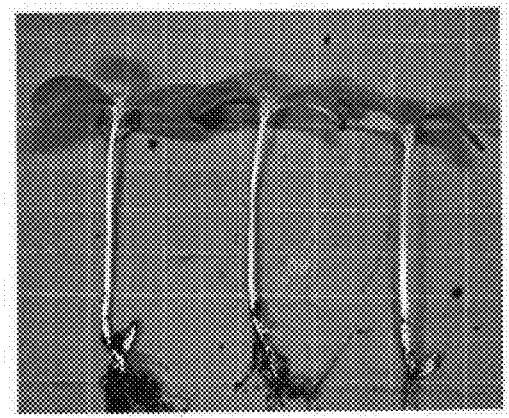
FIG. 11 shows the results of the phytotoxicity portion of the ASTM D6400 test for a second sample formed according to techniques described herein.
Figure 11:
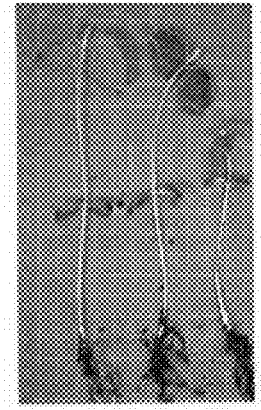
Figure 12:
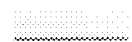
FIG. 12 shows the results of the phytotoxicity portion of the ASTM D6400 test for a third sample formed according to techniques described herein.
Figure 12:
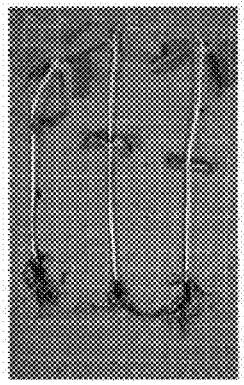
Figure 12:
Figure 12:
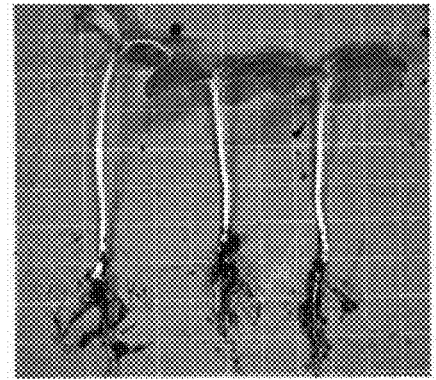
Figure 13:
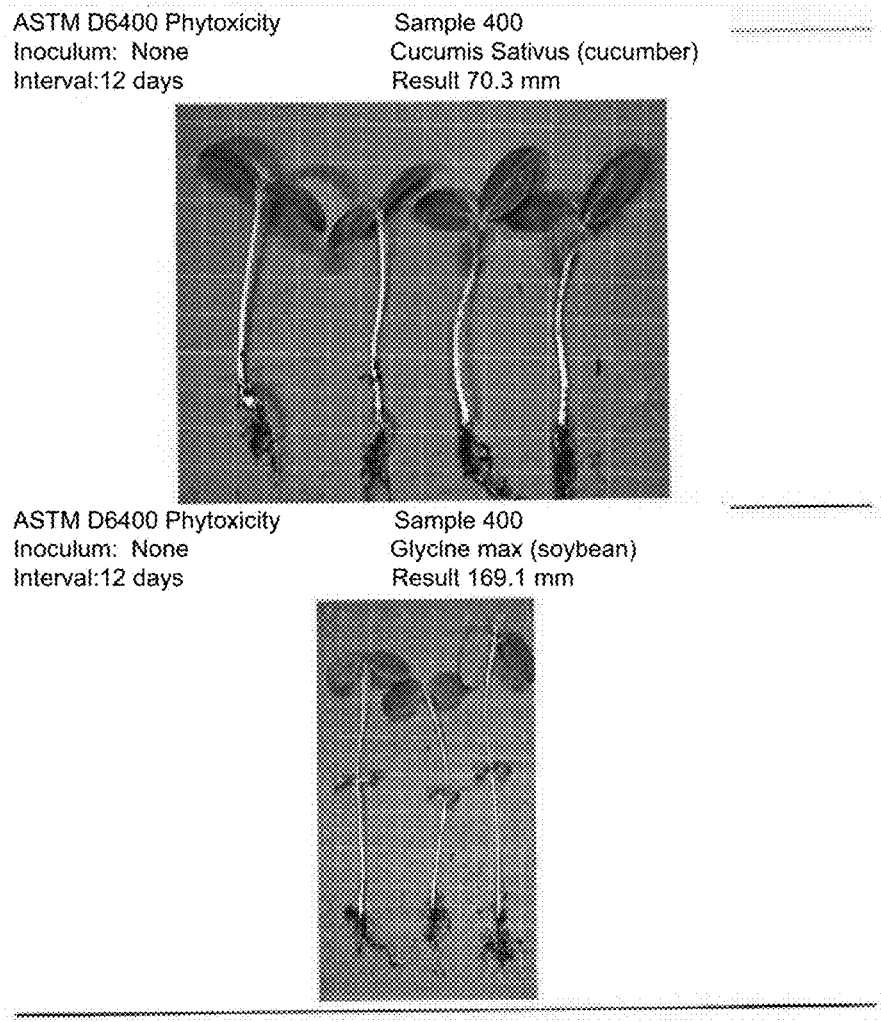
FIG. 13 shows the results of the phytotoxicity portion of the ASTM D6400 test for a fourth sample formed according to techniques described herein.

FIG. 10 shows the results of the phytotoxicity portion of the ASTM D6400 test for sample 100. FIG. 11 shows the results of the phytotoxicity portion of the ASTM D6400 test for sample 200. FIG. 12 shows the results of the phytotoxicity portion of the ASTM D6400 test for sample 300. FIG. 13 shows the results of the phytotoxicity portion of the ASTM D6400 test for sample 400. Passing the phytotoxicity portion of the ASTM D6400 test indicates that the linear low density polyethylene included in the samples was being degraded without the production of harmful byproducts.

FIG. 14A shows the results of the elemental analysis portion of the ASTM D6400 test based on Table 3 of 40 C.P.R. Part 503.13 for sample 100. FIG. 14B shows the results of the elemental analysis portion of the ASTM D6400 test based on Table 3 of 40 C.P.R. Part 503.13 for sample 200. FIG. 15A shows the results of the elemental analysis portion of the ASTM D6400 test based on Table 3 of 40 C.P.R. Part 503.13 for sample 300. FIG. 15B shows the results of the elemental analysis portion of the ASTM D6400 test for sample 400. The results for the elemental analysis portion of the ASTM D6400 test based on Table 3 of 40 C.P.R. Part 503.13 also indicate the absence of harmful byproducts as the samples degraded.

TABLE 17

|  | Sample No. 100 | Sample No. 200 | Sample No. 300 | Sample No. 400 |
|---|---|---|---|---|
| Starch-Based Polymeric Material | 30% | 30% | 40% | 25% |
| First Petrochemical-Based Polymeric Material | 64% | 15% | 50% | 70% |
| Compatibilizer | 5% | 5% | 5% | 5% |
| Biodegradation Enhancing Additive | 1% | 1% | 5% | 0% |
| Second Petrochemical-Based Polymeric Material | 0% | 49% | 0% | 0% |

TABLE 17-continued

|  | Sample No. 100 | Sample No. 200 | Sample No. 300 | Sample No. 400 |
|---|---|---|---|---|
| Film Thickness (mm) | 0.34 | 0.34 | — | 0.44 |
| 98 Day Biodegradability Results | 33% | 29% | 20% | 22% |
| 180 Day Biodegradability Results | 55% | 74% | 45% | 48% |

CONCLUSION

In closing, although the various implementations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the inventive features (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or example language (e.g., "such as") provided herein is intended merely to better illuminate the inventive features and does not pose a limitation on the scope of the inventive features otherwise claimed. No language in the specification should be construed as indicating any non-claimed element essential to the practice of the inventive features.

The particulars shown herein are by way of example and for purposes of illustrative discussion of the preferred embodiments of the inventive features and are presented in the cause of providing what is believed to be the most useful and readily understood description of the principles and conceptual aspects of various embodiments of the inventive features. In this regard, no attempt is made to show structural details of the inventive features in more detail than is necessary for the fundamental understanding of the inventive features, the description taken with the drawings and/or examples making apparent to those skilled in the art how the several forms of the inventive features may be embodied in practice.

Definitions and explanations used in the present disclosure are meant and intended to be controlling in any future construction unless clearly and unambiguously modified in the examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art.

In closing, it is to be understood that the embodiments of the inventive features disclosed herein are illustrative of the principles of the inventive features. Other modifications that may be employed are within the scope of the inventive features. Thus, by way of example, but not of limitation, alternative configurations of the inventive features may be utilized in accordance with the teachings herein. Accordingly, the inventive features are not limited to that precisely as shown and described.

The invention claimed is:

1. An article comprising:
    a starch-based polymeric material formed from a plasticizer and a mixture of starches including a first amount of a first starch and a second amount of a second starch; and
    a polyolefin-based polymeric material;
    wherein the article has a dart drop impact test value that is greater than: (i) a first dart drop impact test value of a first article including the polyolefin-based polymeric material and a first starch-based polymeric material formed from a single starch that is the first starch, and (ii) a second dart drop impact test value of a second article including the polyolefin-based polymeric material and a second starch-based polymeric material formed from a single starch that is the second starch.

2. The article of claim 1, further comprising a compatibilizer present in an amount of about 3% by weight to about 7% by weight of the article.

3. The article of claim 1, wherein the first starch is derived from one of potato, corn, or tapioca; and the second starch is derived from a different one of potato, corn, or tapioca.

4. The article of claim 1, wherein starch-based polymeric material is present in an amount from about 20% by weight to about 30% by weight of the article and the polyolefin-based polymeric material is present in an amount from about 65% by weight to about 75% by weight of the article.

5. The article of claim 4, wherein the first starch comprises from about 10% by weight to about 25% by weight of the mixture of starches.

6. The article of claim 5, wherein:
    the starch-based polymeric material includes a third starch;
    the second starch comprises from about 55% by weight to about 85% by weight of the mixture of starches;
    the third starch comprises from about 10% by weight to about 25% by weight of the mixture of starches; and
    the dart drop impact test value of the article is greater than a third dart drop impact test value of a third article including the polyolefin-based polymeric material and a third starch-based polymeric material formed from a single starch that is the third starch.

7. The article of claim 1, wherein the article has a tensile elongation at break value in the machine direction that is greater than an additional tensile elongation at break value in the machine direction of an additional article formed from the polyolefin-based polymeric material that is free of starch-based polymeric materials.

8. The article of claim 1, wherein the article has a dart drop impact test value that is greater than that for an article of a same thickness that is formed entirely from the one or more polyolefin-based polymeric materials, without the starch-based polymeric material formed from the plasticizer and the mixture of starches.

\* \* \* \* \*